US012001604B2

(12) United States Patent
Yasuda et al.

(10) Patent No.: US 12,001,604 B2
(45) Date of Patent: Jun. 4, 2024

(54) INFORMATION PROCESSING DEVICE, INFORMATION PROCESSING SYSTEM, INFORMATION PROCESSING METHOD, AND PROGRAM

(71) Applicant: Sony Corporation, Tokyo (JP)

(72) Inventors: Ryohei Yasuda, Tokyo (JP); Shinichi Kawano, Tokyo (JP)

(73) Assignee: SONY CORPORATION, Tokyo (JP)

(*) Notice: Subject to any disclaimer, the term of this patent is extended or adjusted under 35 U.S.C. 154(b) by 366 days.

(21) Appl. No.: 17/281,255

(22) PCT Filed: Sep. 19, 2019

(86) PCT No.: PCT/JP2019/036737
§ 371 (c)(1),
(2) Date: Oct. 5, 2021

(87) PCT Pub. No.: WO2020/095546
PCT Pub. Date: May 14, 2020

(65) Prior Publication Data
US 2022/0221933 A1 Jul. 14, 2022

(30) Foreign Application Priority Data
Nov. 7, 2018 (JP) ................. 2018-209506

(51) Int. Cl.
G06F 3/01 (2006.01)
G06F 3/0482 (2013.01)
(Continued)

(52) U.S. Cl.
CPC ............ G06F 3/013 (2013.01); G06F 3/0482 (2013.01); G06V 40/20 (2022.01); H04N 1/32101 (2013.01)

(58) Field of Classification Search
CPC ....... G06F 3/013; G06F 3/0482; G06V 40/20; H04N 1/32101
See application file for complete search history.

(56) References Cited

U.S. PATENT DOCUMENTS 8,571,851 B1 10/2013 Tickner et al.
8,599,133 B2 * 12/2013 Lashina ................. G09F 27/00
345/158

(Continued)

FOREIGN PATENT DOCUMENTS

JP 2004-259198 A 9/2004
JP 2016-63471 A 4/2016

(Continued)

OTHER PUBLICATIONS

International Search Report and Written Opinion dated Nov. 5, 2019, received for PCT Application PCT/JP2019/036737, Filed on Sep. 19, 2019, 8 pages including English Translation.

Primary Examiner — Michael E Teitelbaum
(74) Attorney, Agent, or Firm — XSENSUS LLP

(57) ABSTRACT

An image analysis unit that detects a user's point of gaze with respect to display information of a display unit on the basis of an image captured by a camera, a user attention information analysis unit that extracts attention information on which a user's point of gaze had been for a prescribed length of time or longer and generates a list including information corresponding to the attention information, and a display information generation unit that generates a display list including list configuration data. The user attention information analysis unit continuously inputs user's point-of-gaze information, and executes sorting processing for setting, in the top of the list, latest attention information or attention information on which the user's point of gaze is for a long length of time. The display information generation (Continued)

unit generates a display list including top data of list configuration data, for example.

20 Claims, 14 Drawing Sheets

(51) Int. Cl.
*G06V 40/20* (2022.01)
*H04N 1/32* (2006.01)

(56) References Cited

U.S. PATENT DOCUMENTS

| | | |
|---|---|---|
| 2010/0007601 A1 | 1/2010 | Lashina et al. |
| 2010/0100845 A1* | 4/2010 | Khan .................. G06F 16/9535 715/810 |
| 2010/0141552 A1* | 6/2010 | Ferlitsch ............... G06F 3/1446 345/1.3 |
| 2013/0278625 A1 | 10/2013 | Obata |
| 2019/0096359 A1* | 3/2019 | Uno .......................... G09G 5/00 |

FOREIGN PATENT DOCUMENTS

| | | |
|---|---|---|
| JP | 2017-156906 A | 9/2017 |
| WO | 2016/006136 A1 | 1/2016 |

* cited by examiner

INFORMATION PROCESSING DEVICE, INFORMATION PROCESSING SYSTEM, INFORMATION PROCESSING METHOD, AND PROGRAM

CROSS-REFERENCE TO RELATED APPLICATIONS

The present application is based on PCT filing PCT/JP2019/036737, filed Sep. 19, 2019, which claims priority to JP 2018-209506, filed Nov. 7, 2018, the entire contents of each are incorporated herein by reference.

TECHNICAL FIELD

The present disclosure relates to an information processing device, an information processing system, an information processing method, and a program. More specifically, the present disclosure relates to an information processing device, an information processing system, an information processing method, and a program that specify user attention information by line-of-sight analysis of the user and perform processing based on a specific result.

BACKGROUND ART

Using various electronics such as a personal computer, a video game console, a smartphone, a television, and a digital signage, which is an electronic bulletin board installed in a public space such as a railway station and a building, a human (user) acquires various information and performs communication such as chatting.

However, it is not easy to memorize data displayed on these electronics, and it is particularly troublesome to enter a text character string having been displayed.

For example, in an online game in which a plurality of users participates, chatting is performed among the participating users. In a case where chatting is performed, each user enters a message of his/her own speech in text from a video game console (user terminal) of the user.

The entered text is displayed on the terminal of each chat participant in near real time. Other participants can view the display content and enter a message to have a conversation.

Note that there is, for example, Japanese Patent Application Laid-Open No. 2017-156906 as a conventional technology in which message display processing at the time of performing chatting has been disclosed.

In a case where chatting is performed with a user terminal, each participating user registers his/her own user ID.

For example, the user ID of a user A is AnZvB4K7 and the user ID of a user B is 772TuYks8.

The user ID used in text chatting in an online game or the like is required to be unique. Therefore, the user ID is often a combination of a plurality of character types (uppercase, lowercase, symbol, and number).

In chatting, when a message is entered as a comment on a speech by a specific user, there is a case where a message including a user ID is created in order to clarify which user the speech is made to. For example, in a case of entering a message that someone agrees with a speech made by Mr. A whose user ID is AnZvB4K7, an entry as follows is required: "I agree with the speech by AnZvB4K7".

However, it is difficult to accurately enter such a complicated user ID, and it takes time to accurately enter the user ID.

CITATION LIST

Patent Document

Patent Document 1: Japanese Patent Application Laid-Open No. 2017-156906

SUMMARY OF THE INVENTION

Problems to be Solved by the Invention

The present disclosure has been made in view of the above problem, for example, and its object is to provide an information processing device, an information processing system, an information processing method, and a program that specify user attention information by line-of-sight analysis of the user and perform processing based on a specific result.

Solutions to Problems

A first aspect of the present disclosure lies in an information processing device including:
 a line-of-sight detection unit that detects a user's point of gaze with respect to display information of a display unit;
 a user attention information analysis unit that extracts attention information of the user on the basis of an analysis of the user's point of gaze and generates a list including information corresponding to the attention information; and
 a display information generation unit that generates a display list including configuration data of the list.

Moreover, a second aspect of the present disclosure lies in an information processing system having a display device and a management server, in which
 the display device has
 a line-of-sight detection unit that detects a user's point of gaze with respect to display information of a display unit, and
 the management server has
 a user attention information analysis unit that inputs user's point-of-gaze information having been analyzed in the display device, extracts attention information of the user on the basis of an analysis of the user's point of gaze, and generates a list including information corresponding to the attention information, and
 a display information generation unit that generates a display list including configuration data of the list.

Moreover, a third aspect of the present disclosure lies in an information processing method executed in an information processing device, the information processing method executing
 a line-of-sight detection step in which a line-of-sight detection unit detects a user's point of gaze with respect to display information of a display unit,
 a user attention information analysis step in which a user attention information analysis unit extracts attention information of the user on the basis of an analysis of the user's point of gaze and generates a list including information corresponding to the attention information, and
 a display information generation step in which a display information generation unit generates a display list including configuration data of the list.

Moreover, a fourth aspect of the present disclosure lies in an information processing method executed in an information processing system having a display device and a management server, the information processing method, in which
- the display device executes line-of-sight detection processing of detecting a user's point of gaze with respect to display information of a display unit, and
- the management server executes
- user attention information analysis processing of inputting user's point-of-gaze information having been analyzed in the display device, extracting attention information of the user on the basis of an analysis of the user's point of gaze, and generating a list including information corresponding to the attention information, and
- display information generation processing of generating a display list including configuration data of the list.

Moreover, a fifth aspect of the present disclosure lies in a program causing an information processing device to execute information processing, the program causing
- a line-of-sight detection unit to execute a line-of-sight detection step of detecting a user's point of gaze with respect to display information of a display unit,
- a user attention information analysis unit to execute a user attention information analysis step of extracting attention information of the user on the basis of an analysis of the user's point of gaze and generating a list including information corresponding to the attention information, and
- a display information generation unit to execute a display information generation step of generating a display list including configuration data of the list.

Note that the program of the present disclosure is a program that can be provided by a storage medium or a communication medium that provides, in a computer-readable form, an information processing device or a computer system that can execute various program codes, for example. By providing such a program in a computer-readable form, processing in accordance with the program is implemented on an information processing device or a computer system.

Other objects, features, and advantages of the present disclosure will be made clear by a more detailed description based on the embodiments of the present disclosure as described later and the accompanying drawings. Note that in the present description, the system is a logical set configuration of a plurality of devices, and the system is not limited to those having devices of each configuration are in a same housing.

Effects of the Invention

According to the configuration of an embodiment of the present disclosure, a configuration that detects user attention information and executes various processing based on the detected attention information.

Specifically, the configuration of an embodiment of the present disclosure has, for example, an image analysis unit that detects a user's point of gaze with respect to display information of a display unit on the basis of an image captured by a camera, a user attention information analysis unit that extracts attention information on which a user's point of gaze had been for a prescribed length of time or longer and generates a list including information corresponding to the attention information, and a display information generation unit that generates a display list including list configuration data. The user attention information analysis unit continuously inputs user's point-of-gaze information, and executes sorting processing for setting, in the top of the list, latest attention information or attention information on which the user's point of gaze is for a long length of time. The display information generation unit generates a display list including top data of list configuration data, for example.

This configuration implements a configuration that detects user attention information and executes various processing based on the detected attention information.

Note that the effects described in the present description are merely exemplary and not to be limited, and additional effects may be present.

MODE FOR CARRYING OUT THE INVENTION

Figure 1:
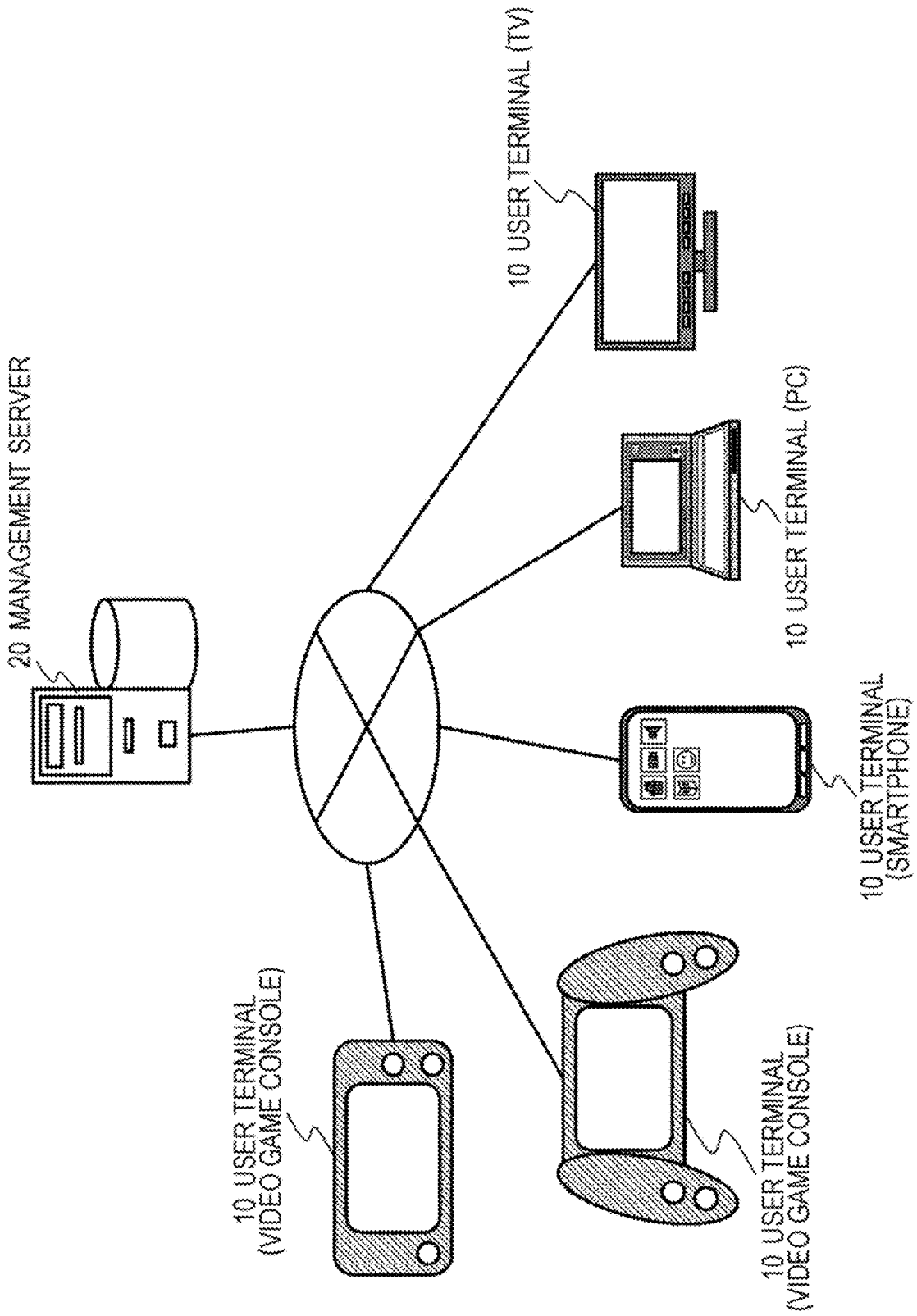
FIG. 1 is a diagram explaining a configuration example of a system capable of executing processing of the present disclosure.

The information processing device, the information processing system, the information processing method, and the program of the present disclosure will be described below in detail with reference to the drawings. Note that the description will be made according to the following items.

1. (First Embodiment) Regarding an embodiment in which attention information of a user is specified on the basis of a user's line-of-sight, a user ID included in the attention information is acquired, and a user ID list is displayed 1-1. Regarding a configuration example of the information processing system of the first embodiment 1-2. Regarding details of the processing of the first embodiment 1-3. Regarding a configuration example of the information processing device of the first embodiment 1-4. Regarding the sequence of processing executed by the information processing device of the first embodiment 2. (Second Embodiment) Regarding an embodiment in which attention information of a user is specified on the basis of a user's line-of-sight, shop/restaurant information corresponding to the attention information is acquired, and a shop/restaurant list is displayed 2-1. Regarding a configuration example of the information processing system of the second embodiment 2-2. Regarding details of the processing of the second embodiment 2-3. Regarding a processing example in which the management server generates merged data of attention shop/restaurant lists of a plurality of users 2-4. Regarding a configuration example of the information processing system of the second embodiment 2-5. Regarding the sequence of processing executed by the information processing system of the second embodiment 3. Regarding other embodiments 4. Regarding a hardware configuration example of an information processing device 5. Summary of the configuration of the present disclosure 1. (First Embodiment) Regarding an Embodiment in which Attention Information of a User is Specified on the Basis of a User's Line-of-Sight, a User ID Included in the Attention Information is Acquired, and a User ID List is Displayed First, as the first embodiment, an embodiment in which attention information of a user is specified on the basis of a user's line-of-sight, a user ID included in the attention information is acquired, and a user ID list is displayed will be described.

The first embodiment is an embodiment that can be used in a conversation with text entered and displayed to a user terminal, such as a chat executed in an online game and the like in which a plurality of users participates, for example.

As described earlier, in a chat in which a plurality of users participates, each user enters his/her own speech, i.e., a message in text from a user terminal. This entered text is displayed on each participant's terminal in near real time. Other participants can view the display content and enter a message to have a conversation.

In a chat via a user terminal, in a case of entering a message as a comment on a speech by a specific user and the like, it is necessary to create a message including a complicated user ID as described above, for example, a user ID such as "AnZvB4K7", in order to specify a user.

However, it is difficult to accurately enter such a complicated user ID, and it takes time to accurately enter the user ID.

The embodiment as described later is an embodiment that has simplified such a troublesome entry of a user ID and has enabled a speech specifying the user to be made easily and accurately.

(1-1. Regarding a Configuration Example of the Information Processing System of the First Embodiment)

A configuration example of the information processing system of the first embodiment will be described.

FIG. 1 is a diagram showing an example of a network configuration corresponding to an information processing system that performs the processing of the present embodiment.

The network configuration shown in FIG. 1 has a configuration in which a plurality of user terminals 10 and a management server 20 can communicate via a network.

The network configuration shown in FIG. 1 is a network capable of executing an online game, for example, and a plurality of users who owns the respective user terminals 10 performs chatting (conversation) by entering the user's speech contents in text into the user terminals while executing the online game.

The management server 20 is a management server that performs management processing of an online game and chatting, for example.

The user terminal 10 includes various electronics such as a video game console, a smartphone, a PC, and a television.

The user terminal 10 can perform an online game and chatting by transmitting and receiving various data by communication between the user terminals or communication via the management server 20.

(1-2. Regarding Details of the Processing of the First Embodiment)

Next, details of the processing of the first embodiment will be described with reference to FIG. 2 and subsequent figures.

Figure 2:
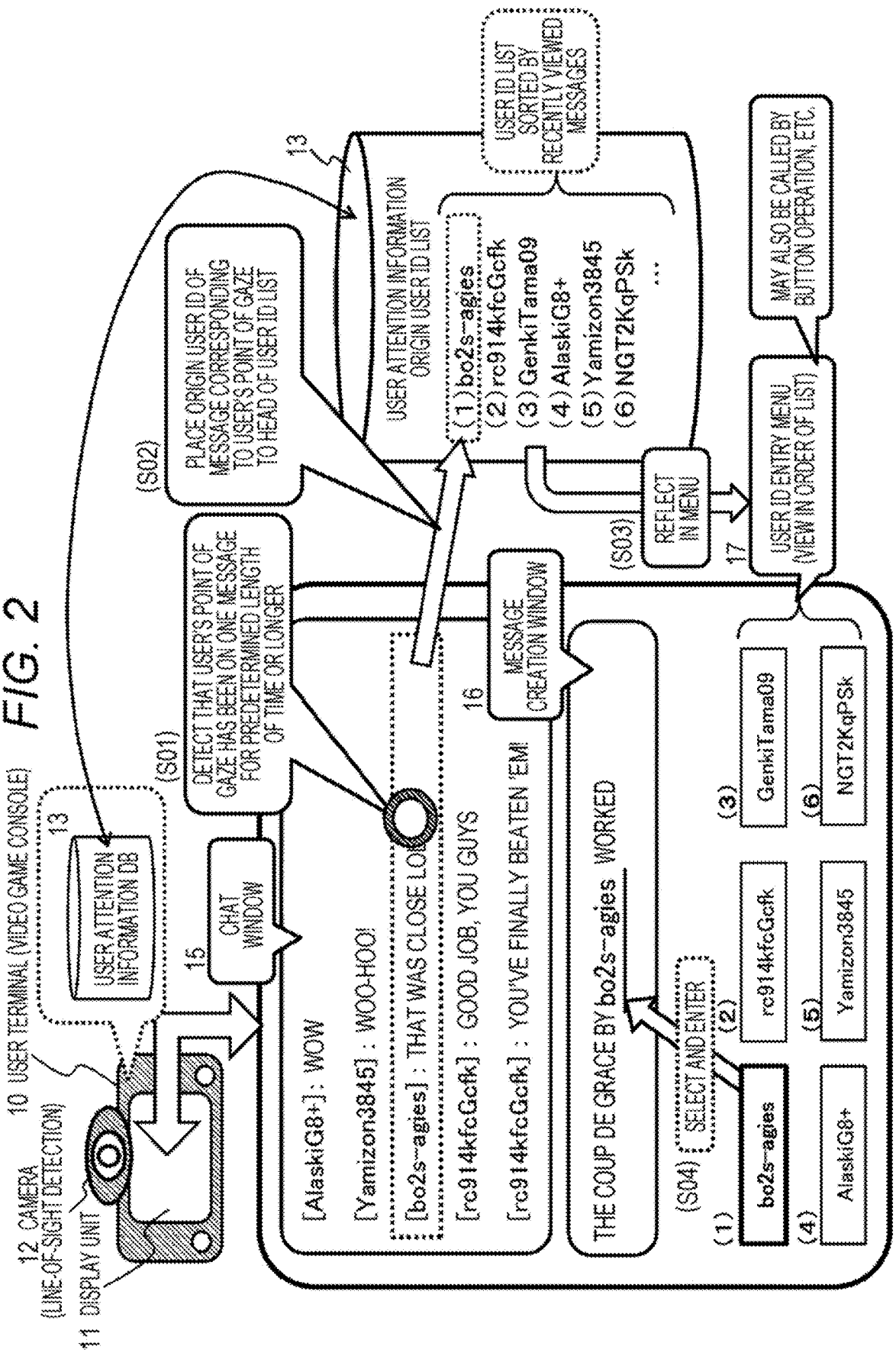
FIG. 2 is a diagram explaining a configuration and a processing example of an information processing device.

FIG. 2 is a diagram explaining the configuration and processing of one user terminal 10 used by one user during execution of chatting with a plurality of users via the network.

As shown in the upper left part of FIG. 2, the user terminal 10 has a display unit 11 and a camera 12. Moreover, a storage unit inside the user terminal 10 has a user attention information database (DB) 13.

As shown on the left in FIG. 2, the display unit 11 displays a chat window 15, a message creation window 16, and a user ID entry menu 17.

The chat window 15 displays contents of the chat with the plurality of users during execution via the network.

The chat window 15 displays the user ID of the user having originated a message and the message.

[AlaskiG8+] and the like Shown in the Figure are User IDs, and the Subsequent Text such as "Wow" and the Like is a Message.

Since the user ID is required to be unique as described earlier, the user ID is often a combination of a plurality of character types (uppercase, lowercase, symbol, and number) and thus complicated.

The message creation window 16 displays a message entered via the user terminal 10 by a user using this user terminal.

In a case where a user enters his/her own message in the message creation window 16 as a comment on a speech by a specific user, the user ID needs to be entered in order to clarify which user the speech is made to.

In the example shown in the figure, the following message is entered in the message creation window 16.

"The coup de grace by bo2s-agies worked" Here, "bo2s-agies" is the user ID of the message originator to be commented.

It is difficult to enter a user ID including such a complicated character string as "bo2s-agies" without error, and this becomes a burden on the user.

Therefore, in the configuration of the present disclosure, the display unit 11 displays the user ID entry menu 17 as shown in the figure, and the message creation window 16 displays the user IDs that the use can enter only by selecting the user ID he/she desires to enter from the user ID entry menu 17.

A control unit (data processing unit) of the user terminal 10 executes creation and update of a list of user IDs to be displayed on the user ID entry menu 17, and further executes processing of displaying the latest list on the display unit 11.

The processing executed by the control unit (data processing unit) of the user terminal 10 will be described.

The control unit (data processing unit) of the user terminal 10 executes the processing of steps S01 to S03 shown in FIG. 2.

First, in step S01, it is detected that the user's point of gaze had been on, for a predetermined length of time or longer, one message displayed in the chat window 15 of the display unit 11.

The predetermined length of time is, for example, 3 seconds and the like, and this length of time can be freely set by the user.

The control unit (data processing unit) of the user terminal 10 analyzes an image captured by the camera 12 to acquire the position of the user's point of gaze, and determines whether or not the user's point of gaze had been on one message display region for a predetermined length of time (for example, 3 seconds) or longer. The one message display region is an internal region of a dotted line frame shown in the chat window 16 in the figure, for example.

Next, in step S02, the control unit (data processing unit) of the user terminal 10 acquires the user ID of the originator of the message on which the user's point of gaze had been for a predetermined length of time (for example, 3 seconds) or longer, creates and updates a user ID list in which the acquired user ID is set at the head, and stores the user ID list into a user attention information DB 13 in the user terminal 10.

The right side of FIG. 2 shows an example of a user attention information origin user ID list stored in the user attention information DB 13 set in the storage unit in the user terminal 10.

The list is a list including the following user IDs, for example.

(1) bo2s-agies
(2) rc914kfcGcfk
(3) GenkiTama09
(4) AlaskiG8+
(5) Yamizon3845
(6) NGT2KqPSk
. . .

All of the user IDs (1) to (6) included in this list are user IDs of the originating users of the messages on which the user had gazed for a predetermined length of time or longer.

The order in the list is set so that those with newer attention timing of the user are ranked higher. The control unit sequentially executes update processing of the list in accordance with observation data of the gazing status of the user.

Among the user IDs (1) to (6) included in the list, the user ID of (1) is the origin user ID of the latest attention message, and the user IDs are arrayed in reverse chronological order from newest to oldest in the attention time from (2) to (6).

The upper limit in the number of IDs included in the list is, for example, 6, 10, or the like, and can be set by the user.

Next, in step S03, the control unit (data processing unit) of the user terminal 10 selects a user ID higher in the list from the "user attention information origin user ID list" stored in the user attention information DB 13 and displays it in the user ID entry menu 17 region of the display unit 11.

In the example shown in figure, the following six user IDs are displayed in the user ID entry menu 17 region of the display unit 11.

(1) bo2s-agies
(2) rc914kfcGcfk
(3) GenkiTama09
(4) AlaskiG8+
(5) Yamizon3845
(6) NGT2KqPSk These six user IDs are six user IDs corresponding to the six messages that the user using the user terminal 10 has most recently paid attention to.

That is, they are the six user IDs selected in order from the newest in terms of gazing timing from the originator IDs of the messages that the user had gazed for a predetermined length of time (for example, 3 seconds) or longer.

Note that the number of user IDs to be displayed in the user ID entry menu 17 region of the display unit 11 can also be freely set by the user.

It is also possible to set the user ID entry menu 17 region to display none of the user IDs at all. The display/non-display may be configured to be switchable by a button operation.

Finally, in step S04, the control unit (data processing unit) of the user terminal 10 detects the user's selection entry for the user ID displayed in the user ID entry menu 17 region, and displays the selected user ID in the message creation window 16.

The user can complete the entry processing of the selected user ID only by selecting the user ID displayed in the user ID entry menu 17 region.

The selection processing is performed by touch processing of the user ID display region of the display unit 11 configured as a touch screen or by user ID selection information entry processing via other input units.

In the example shown in the figure, the following user entry message is displayed in the message creation window 16.

"The coup de grace by bo2s-agies worked"

Here, "bo2s-agies" is the user ID of the user of the message originator to be commented.

This "bo2s-agies" is one user ID selected by the user from the user IDs displayed in the user ID entry menu 17 region.

The control unit (data processing unit) of the user terminal 10 detects the ID selection information of the user and displays the selected user ID in the message creation window 16.

Thus, in the configuration of the present disclosure, the user can complete the entry processing of the selected user ID only by selecting the user ID displayed in the user ID entry menu 17 region when entering a message.

The user IDs displayed in the user ID entry menu 17 region are the user IDs corresponding to a plurality of messages that the user using the user terminal 10 has most recently paid attention to.

That is, a list including the user IDs of the users who are the originators of the messages that the user had most recently paid attention to, among the messages originated from the other users executing the chatting, is displayed. Therefore, user ID entry at the time of entering a message can be executed accurately in a short time, and timely chat progress can be achieved.

Note that in the configuration described with reference to FIG. 2, a configuration in which the user attention information DB 13 is stored in the user terminal 10 has been described, but the user attention information DB may be configured to be installed in the management server 20 capable of communicating with the user terminal 10, for example.

Figure 3:
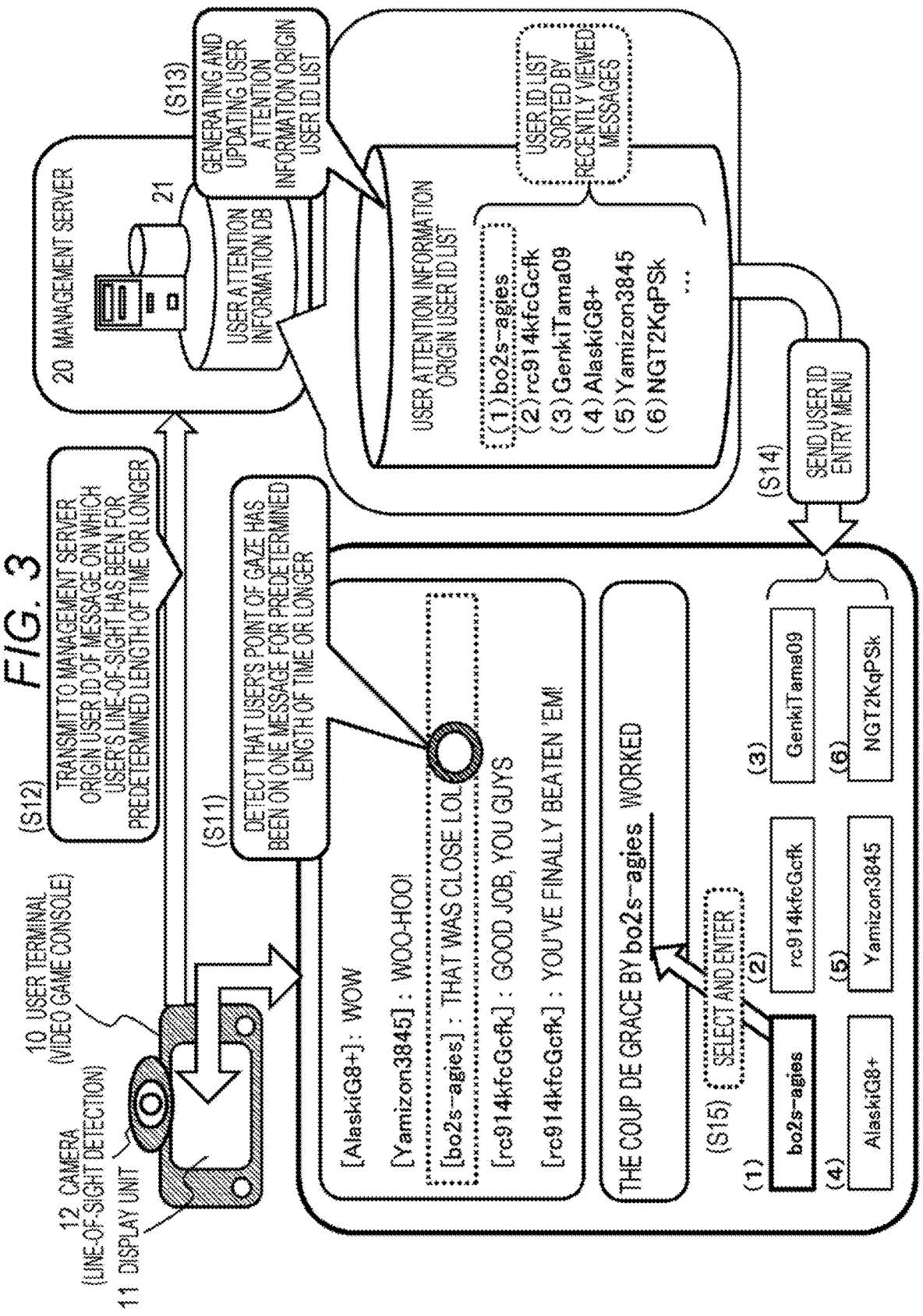
FIG. 3 is a diagram explaining a configuration and a processing example of an information processing device.

FIG. 3 shows a configuration example in which a user attention information DB 21 is installed in the management server 20.

The user attention information DB 21 installed in the management server 20 is the user attention information DB 21 corresponding to each user terminal.

In the configuration shown in FIG. 3, the control unit (data processing unit) of the management server 20 executes generation and update of a user attention information origin user ID list to be stored in the user attention information DB 21, and further executes selection processing of the user ID to be displayed on the user ID entry menu 17 of the user terminal 10 and transmission processing to the user terminal 10.

The processing sequence in the configuration shown in FIG. 3 will be described. The processing is executed in the order of steps S11 to S15 shown in FIG. 3.

First, in step S11, it is detected that the user's point of gaze had been on, for a predetermined length of time or longer, one message displayed in the chat window 15 of the display unit 11.

The predetermined length of time is, for example, 3 seconds and the like, and this length of time can be freely set by the user.

This processing is executed by the control unit (data processing unit) of the user terminal 10.

Next, in step S12, the control unit (data processing unit) of the user terminal 10 acquires the user ID of the originator of the message on which the user's point of gaze had been for a predetermined length of time (for example, 3 seconds) or longer, and transmits the acquired user ID to the management server 20. Note that the transmitted data also includes an identifier of the user terminal 10.

Next, in step S13, the management server 20 executes generation and update processing of the user attention information origin user ID list to be stored in the user attention information DB 21 on the basis of the user ID received from the user terminal 10.

Note that this user attention information origin user ID list is generated as data for each user terminal.

The configuration of the list is similar to that of the list described with reference to FIG. 2, and the user IDs included in the list are each the user ID of the originating user of the message that the user had gazed for a predetermined length of time or longer.

The order in the list is sequentially updated by the control unit (data processing unit) of the management server 20 so that those with newer attention timing of the user are set higher.

Among the user IDs (1) to (6) included in the list, the user ID of (1) is the origin user ID of the latest attention message, and the user IDs are arrayed in reverse chronological order from newest to oldest in the attention time from (2) to (6).

Next, in step S14, the management server 20 selects a user ID at the top of the list from the "user attention information origin user ID list" stored in the user attention information DB 21 and transmits it to the user terminal 10. The transmitted data is displayed on the user ID entry menu 17 region of the display unit 11 of the user terminal 10.

Finally, in step S15, the control unit (data processing unit) of the user terminal 10 detects the user's selection entry for the user ID displayed in the user ID entry menu 17 region, and displays the selected user ID in the message creation window 16.

The user can complete the entry processing of the selected user ID only by selecting the user ID displayed in the user ID entry menu 17 region when entering a message.

In the processing example shown in FIG. 3, generation and update of the list are executed by the management server 20, thereby reducing the processing load on the user terminal 10. Therefore, it can be used even in the user terminal 10 having a low processing capacity.

(1-3. Regarding a Configuration Example of the Information Processing Device of the First Embodiment)

Next, a configuration example of the information processing device of the first embodiment will be described.

Figure 4:
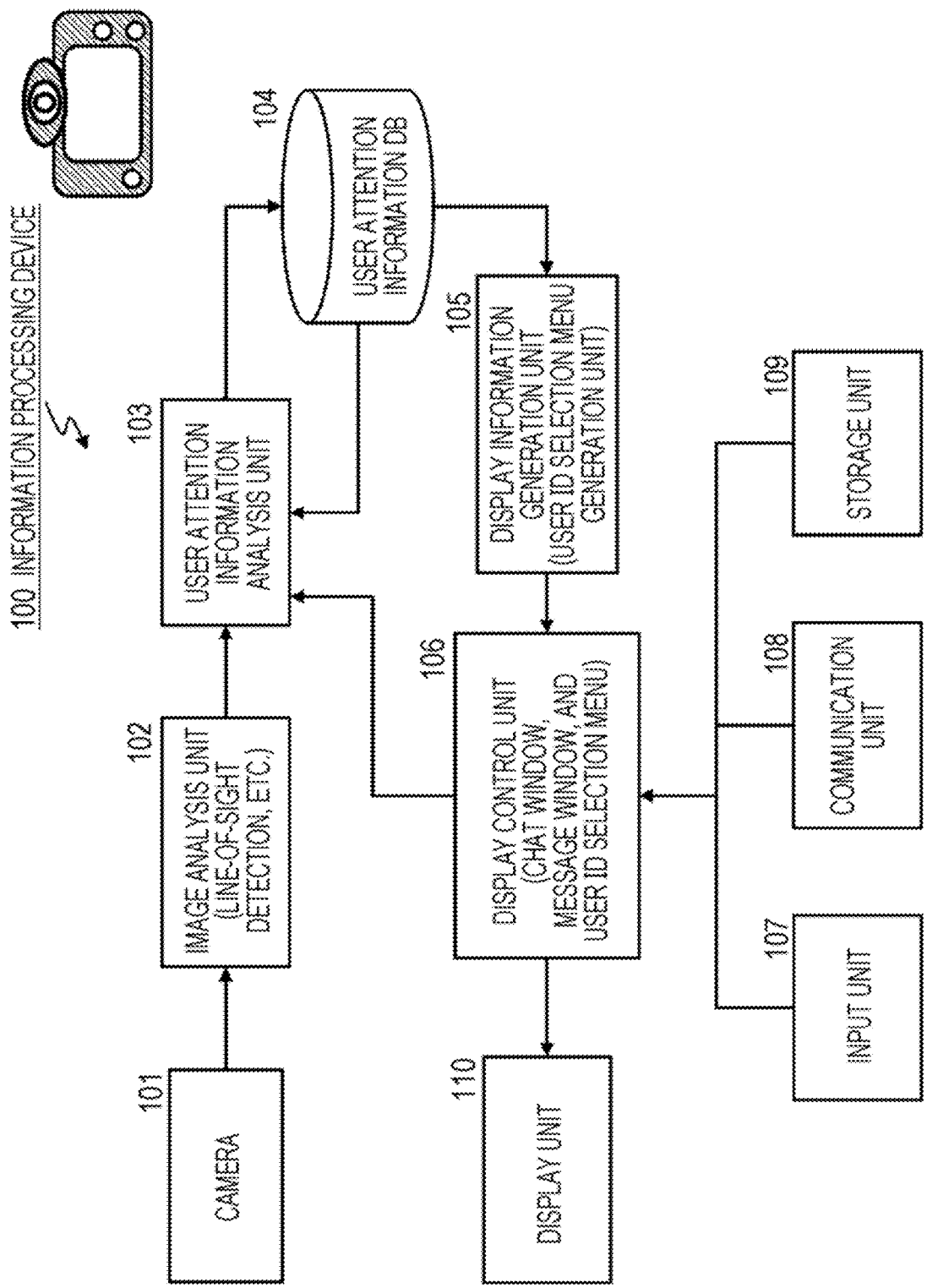
FIG. 4 is a diagram explaining a configuration example of an information processing device.

FIG. 4 is a block diagram showing a configuration example of an information processing device 100.

The information processing device 100 shown in FIG. 4 is a configuration example of the information processing device 100 corresponding to the user terminal 10 in a case of the configuration described with reference to FIG. 2, i.e., the configuration in which the user terminal 10 performs all the processing.

Note that in a case of the configuration described with reference to FIG. 3, a part of the information processing device 100 shown in FIG. 4 is set to belong to the user terminal 10 and a part is set to belong to the management server 20.

Hereinafter, as an example, a configuration example of the information processing device 100 in a case where the user terminal 10 described with reference to FIG. 2 performs all the processing will be described.

As shown in FIG. 4, the information processing device 100 includes a camera 101, an image analysis unit 102, a user attention information analysis unit 103, a user attention information DB 104, a display information generation unit (user ID selection menu generation unit) 105, a display control unit 106, an input unit 107, a communication unit 108, a storage unit 109, and a display unit 110.

The camera 101 captures an image of a face including the eyes of the user operating the information processing device 100. An image captured by the camera 101 is input to the image analysis unit 102.

The image analysis unit 102 inputs the image captured by the camera 101 and detects the line-of-sight direction of the user operating the information processing device 100. The user line-of-sight direction analyzed by the image analysis unit 102 is input to the user attention information analysis unit 103.

The user attention information analysis unit 103 specifies information that the user is paying attention to on the basis of the user line-of-sight direction analyzed by the image analysis unit 102 and the display information of the information processing device 100, determines whether or not the user's point of gaze has been on one information display region for a prescribed length of time (for example, 3 seconds) or longer, and, in a case where the user's point of gaze has been on, selects the information as user attention information.

Moreover, the user attention information analysis unit 103 extracts, from the selected user attention information region, a user ID that is a component of the user attention information, i.e., a user ID indicating the originator of the message in the user attention information, generates or updates the "user attention information origin user ID list", and stores it in the user attention information DB 104.

Note that the "user attention information origin user ID list" to be stored in the user attention information DB 104 is, as described earlier, a list having been set so that those with newer attention timing of the user are set higher.

The user attention information analysis unit 103 continuously inputs the user line-of-sight direction analyzed by the image analysis unit 102, acquires, at any time, a user ID from an information region on which the user's point of gaze had been for a prescribed length of time (for example, 3 seconds) or longer, and updates "user attention information origin user ID list" stored in the user attention information DB 104 in accordance with the acquired information.

The display information generation unit (user ID selection menu generation unit) 105 selects a plurality of top user IDs from "user attention information origin user ID list" stored in the user attention information DB 104 and generates a user ID selection menu to be displayed on the display unit 110.

The user ID selection menu to be displayed on the display unit 110 is the user ID selection menu 17 described with reference to FIG. 2 and the like.

The display control unit 106 executes display control of display data of the display unit described with reference to FIGS. 2 and 3, i.e., various data to be displayed on the display unit 110 such as a chat window, a message creation window, and a user ID entry menu.

The input unit 107 includes an operation unit and the like that execute entry processing such as user input to the information processing device 100. Note that in a case where the display unit 110 is configured as a touch screen, the display unit 110 is also a part of the input unit.

The communication unit 108 executes communication between the information processing device 100 and other user terminals or the management server.

The storage unit 109 is a storage unit used as a program of processing executed by the information processing device 100, a parameter applied to data processing, and a work area applied to data processing. Note that in the storage unit 109, identification information and the like of the information processing device 100 are also recorded.

The display unit 110 displays the display data generated by the display control unit 106. Specifically, the chat window, the message creation window, the user ID entry menu, and the like described with reference to FIGS. 2 and 3 are displayed.

(1-4. Regarding the Sequence of Processing Executed by the Information Processing Device of the First Embodiment)

Next, the sequence of processing executed by the information processing device 100 will be described with reference to the flowchart shown in FIG. 5.

Figure 5:
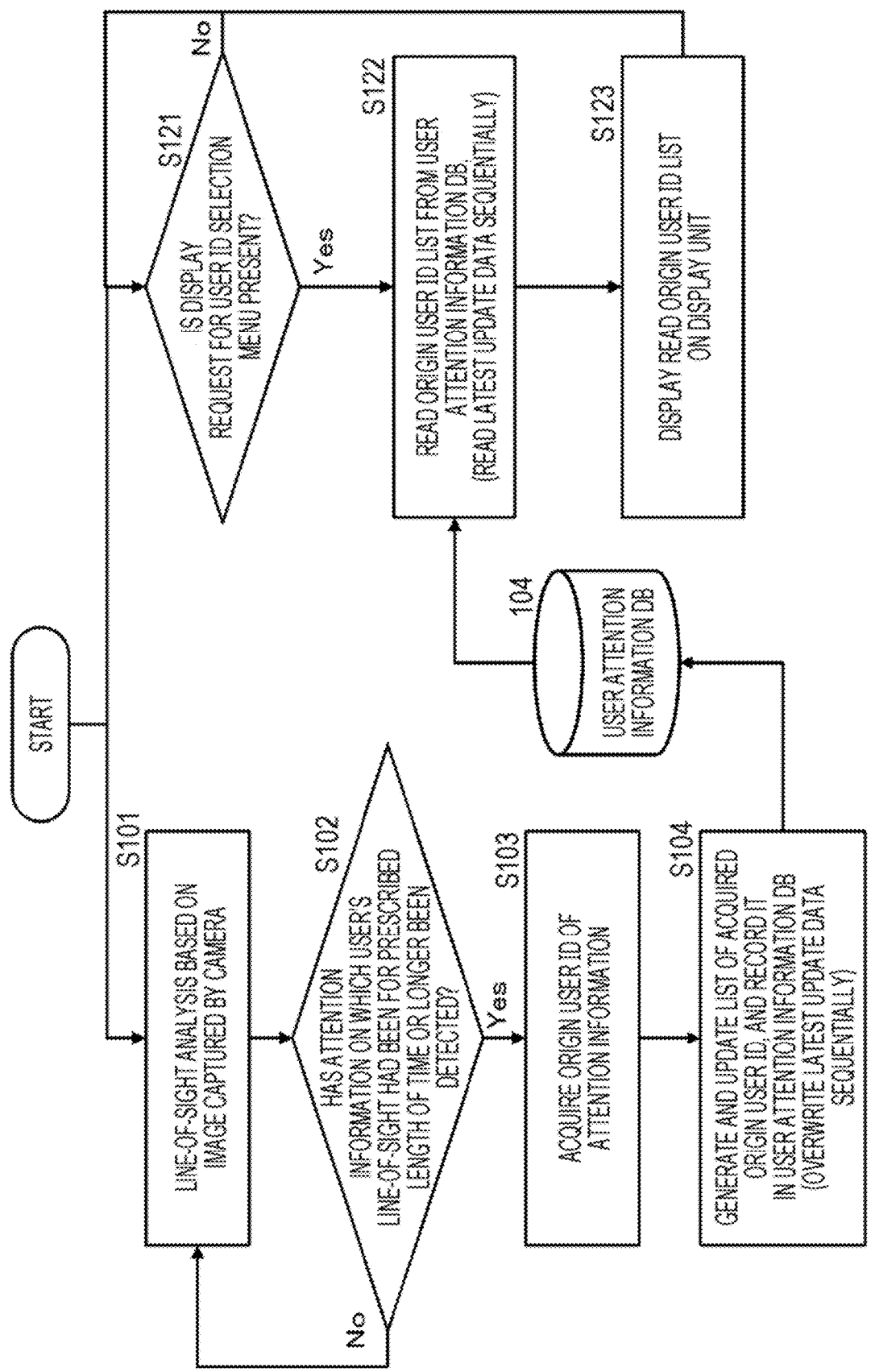
FIG. 5 is a view showing a flowchart explaining a sequence of processing executed by the information processing device of the present disclosure.

Note that the processing in accordance with the flowchart shown in FIG. 5 can be executed in accordance with a program stored in the storage unit of the information processing device 100, and can be performed as program execution processing by a processor such as a CPU having a program execution function, for example.

The processing of each step of the flow shown in FIG. 5 will be described below.

Note that the processing of steps S101 to S104 and the processing of steps S121 to S123 in the flow shown in FIG. 5 are executed in parallel.

First, the processing of steps S101 to S104 will be described.

(Step S101)

First, in step S101, line-of-sight analysis based on the image captured by the camera is executed. This processing is processing to be executed by the image analysis unit 102 of the information processing device 100 shown in FIG. 4.

In step S101, the image analysis unit 102 inputs the image captured by the camera 101 and detects the line-of-sight direction of the user operating the information processing device 100. The detected user line-of-sight direction information is input to the user attention information analysis unit 103.

(Step S102)

Next, in step S102, it is determined whether or not attention information on which the user line-of-sight had been for a prescribed length of time or longer has been detected.

This processing is processing executed by the user attention information analysis unit 103 shown in FIG. 4.

The user attention information analysis unit 103 specifies information that the user is paying attention to on the basis of the user line-of-sight direction analyzed by the image analysis unit 102 and the display information of the information processing device 100, determines whether or not the user's point of gaze has been on one information display region for a prescribed length of time (for example, 3 seconds) or longer.

In a case where, in step S102, attention information on which the user line-of-sight had been for a prescribed length of time or longer has been detected, the processing proceeds to step S103. If not detected, the processing of step S101 and the subsequent steps are repeated.

(Step S103)

In a case where, in step S102, attention information on which the user line-of-sight had been for a prescribed length of time or longer has been detected, the processing proceeds to step S103.

In step S103, the origin user ID of the attention information is acquired.

This processing is also processing executed by the user attention information analysis unit 103 shown in FIG. 4.

The user attention information analysis unit 103 extracts, from the user attention information region on which the user line-of-sight had been for a prescribed length of time or longer, a user ID that is a component of the user attention information, i.e., a user ID indicating the originator of the message in the user attention information.

(Step S104)

Next, in step S104, the list of the origin user IDs acquired in step S103 is generated, updated, and recorded in the user attention information DB 104.

This processing is also processing executed by the user attention information analysis unit 103 shown in FIG. 4.

The user attention information analysis unit 103 extracts a user ID indicating the originator of the message in the user attention information, generates or updates the "user attention information origin user ID list", and stores it in the user attention information DB 104.

Note that the "user attention information origin user ID list" to be stored in the user attention information DB 104 is, as described earlier, a list having been set so that those with newer attention timing of the user are set higher.

Next, the processing of steps S121 to S123 executed in parallel with the processing of steps S101 to S104 will be described.

(Step S121)

First, in step S121, the presence/absence of a display request for the user ID selection menu is detected.

This processing is executed by the display control unit 106 of the information processing device 100 shown in FIG. 4.

The display control unit 106 determines whether or not the user has input a display request of the user ID selection menu via the input unit 107.

Note that this sequence is a processing example of a case where the user ID selection menu is configured to be displayed only in a case where a user request has been made.

It is also possible to set to display the user ID selection menu regardless of the presence/absence of a user request.

In a case where it is determined in step S121 that a display request for the user ID selection menu has been made, the processing proceeds to step S122.

(Step S122)

In a case where it is determined in step S121 that a display request for the user ID selection menu has been made, the processing proceeds to step S122, and in step S122, the origin user ID list is read from the user attention information DB 104.

This processing is processing executed by the display information generation unit (user ID selection menu generation unit) 105 shown in FIG. 4.

The display information generation unit (user ID selection menu generation unit) 105 reads an origin user ID list from the user attention information DB 104.

Note that the origin user ID list is a list generated and updated by the user attention information analysis unit 103 in the processing of step S104 described earlier, and the latest update data is read from the user attention information DB 104.

(Step S123)

Next, in step S123, the origin user ID list having been read is displayed on the display unit.

This processing is processing executed by the display information generation unit (user ID selection menu generation unit) 105 and the display control unit 106 shown in FIG. 4.

The display information generation unit (user ID selection menu generation unit) 105 selects a plurality of top user IDs from "user attention information origin user ID list" stored in the user attention information DB 104 and generates a user ID selection menu to be displayed on the display unit 110.

The display control unit 106 displays, on the display unit 110, the user ID selection menu generated by the display information generation unit (user ID selection menu generation unit) 105.

The user ID selection menu is the user ID selection menu 17, which is a component of the display data of the display unit described earlier with reference to FIGS. 2 and 3.

The user can complete the entry processing of the selected user ID only by selecting the user ID displayed in the user ID entry menu 17 region when entering a message.

2. (Second Embodiment) Regarding an Embodiment in which Attention Information of a User is Specified on the Basis of a User'S Line-of-Sight, Shop/Restaurant Information Corresponding to the Attention Information is Acquired, and a Shop/Restaurant List is Displayed Next, as the second embodiment, an embodiment in which attention information of a user is specified on the basis of a user's line-of-sight, shop/restaurant information corresponding to the attention information is acquired, and a shop/restaurant list is displayed will be described.

This second embodiment is an embodiment using, for example, an electronic bulletin board as a public terminal placed in the entrance of a building having many restaurants and the like, which is so-called a digital signage.

The second embodiment executes processing in which the line-of-sight information of the user with respect to the shop/restaurant information displayed on the digital signage is analyzed to specify the user attention information, and the specified user attention information, specifically, the shop/restaurant name or the like is displayed on a user terminal such as a smartphone.

(2-1. Regarding a Configuration Example of the Information Processing System of the Second Embodiment)

A configuration example of the information processing system of the second embodiment will be described.

Figure 6:
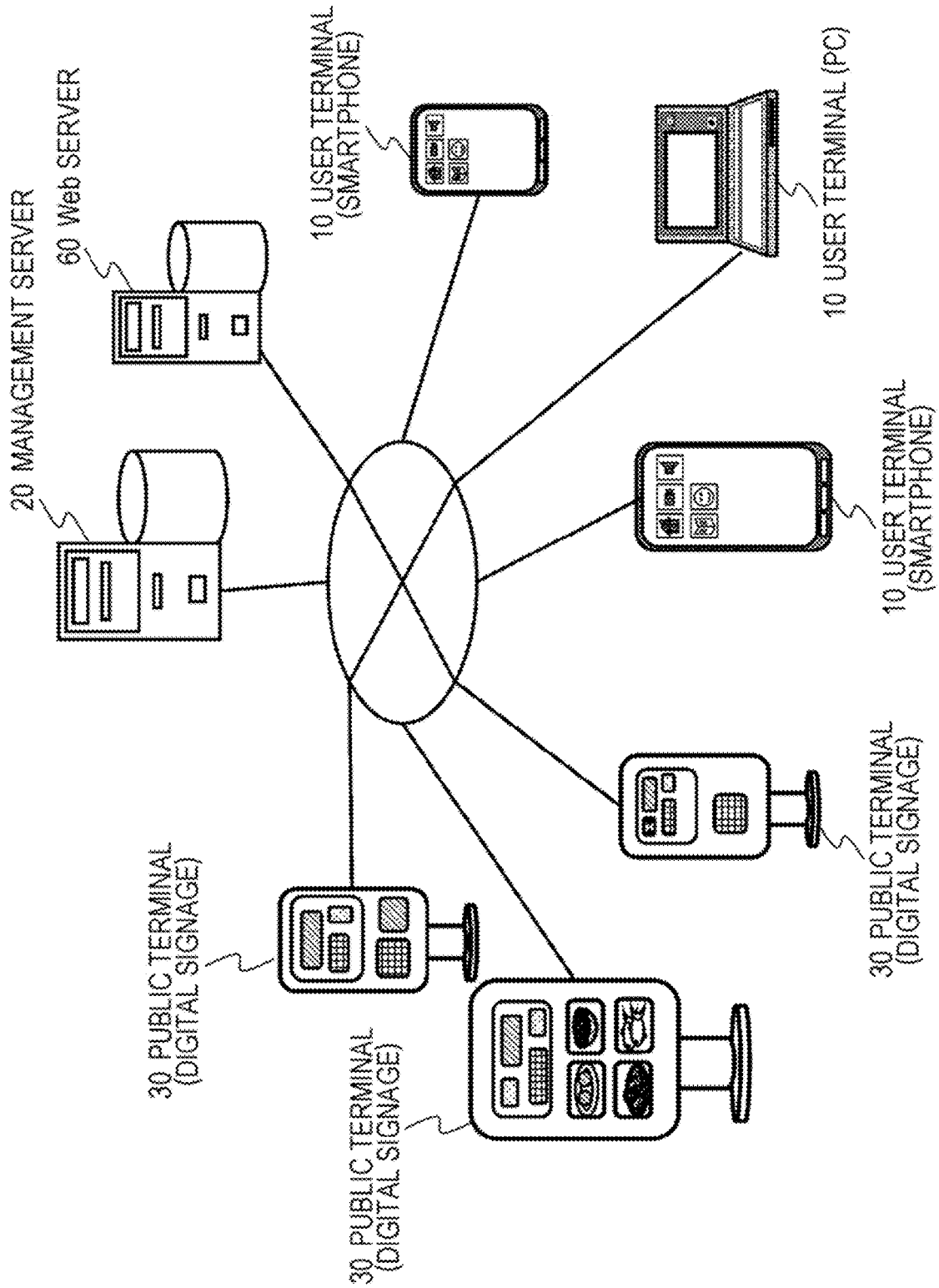
FIG. 6 is a diagram explaining a configuration example of a system capable of executing processing of the present disclosure.

FIG. 6 is a diagram showing an example of a network configuration corresponding to an information processing system that performs the processing of the present embodiment.

The network configuration shown in FIG. 6 is configured such that the plurality of user terminals 10, a plurality of public terminals (digital signages) 30, the management server 20, and a web server 60 can communicate via a network.

The user terminal 10 includes various devices such as a smartphone and a PC.

The public terminal (digital signage) 30 is, for example, a public terminal placed in the entrance of a building having many restaurants and the like.

The public terminal (digital signage) 30 displays guide information such as shop/restaurant information regarding various restaurants or the like.

The management server 20 executes analysis processing of user attention information, for example, attention shop/restaurant information, generation processing of a user attention information list (attention shop/restaurant list), and the like.

The web server 60 is a server that provides a web page including detailed information of a store, a restaurant, and the like.

For example, a smartphone, a PC, or the like as the user terminal 10 can access a web page of a shop, a restaurant, or the like provided by the web server 60 to check detailed information of the shop, the restaurant, or the like.

(2-2. Regarding Details of the Processing of the Second Embodiment)

Next, details of the processing of the second embodiment will be described with reference to FIG. 7 and subsequent figures.

Figure 7:
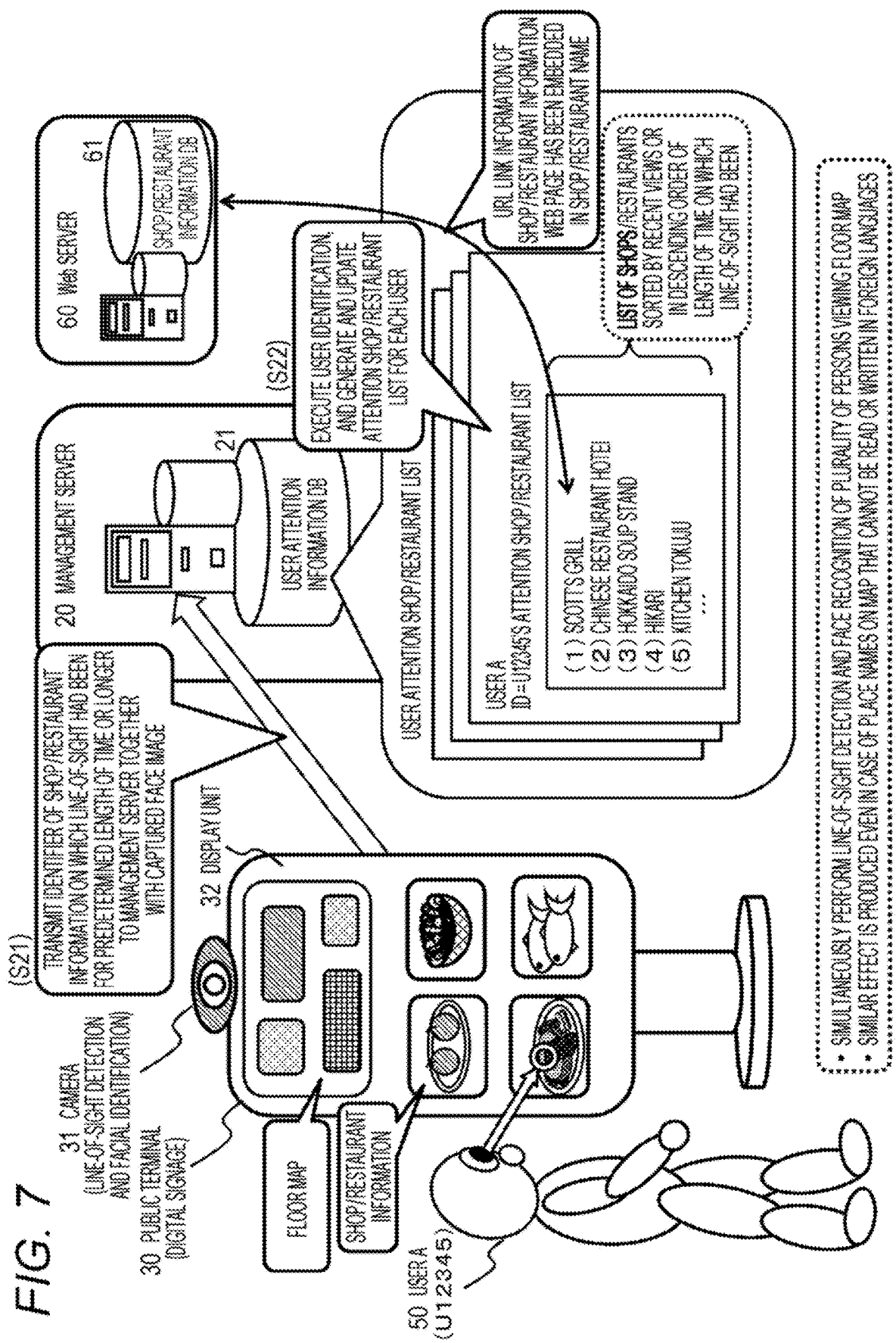
FIG. 7 is a diagram explaining a configuration and a processing example of an information processing device.

FIG. 7 shows one public terminal 30.

The public terminal 30 has a camera 31 and a display unit 32.

The display unit 32 displays, for example, a floor map and shop/restaurant information of each shop/restaurant on the floor.

One user A50 is viewing one piece of the shop/restaurant information displayed on the display unit 32.

The camera 31 captures the face of the user viewing information displayed on the display unit 32 of the public terminal 30. The control unit (data processing unit) inside the public terminal 30 analyzes an image captured by the camera 31 to acquire the position of the user's point of gaze, and determines whether or not the user's point of gaze had been on one shop/restaurant information display region for a predetermined length of time (for example, 3 seconds) or longer.

In a case of determining in the (step S21) shown in the figure that the user's point of gaze had been on one shop/restaurant information display region for a predetermined length of time (for example, 3 seconds) or longer, the control unit (data processing unit) inside the public terminal 30 transmits, to the management server 20, the identifier of the shop/restaurant information together with the face image of the user captured by the camera 31.

Next, in (step S22) shown in the figure, the management server 20 executes user identification on the basis of the face image of the user received from the public terminal 30, and further generates an attention shop/restaurant list for each identified user.

Note that the management server 20 has a user information DB in which a face image is registered in advance in association with a user ID, and specifies the user by matching the registered face image stored in this user information DB with the face image of the user received from the public terminal 30.

The user ID associated with the face image is registered in the user information DB.

Here, it is assumed that the user A50 has the user ID=U12345.

The management server 20 generates an attention shop/restaurant list corresponding to this user ID=U12345, and stores it in the user attention DB 21.

The right side of FIG. 7 shows an example of a user attention shop/restaurant list stored in the user attention information DB 21 set in the storage unit in the management server 20.

The list is a list including the following shop/restaurant names.
(1) Scott's Grill
(2) Chinese Restaurant Hotei
(3) Hokkaido Soup Stand
(4) HIKARI
(5) KITCHEN Tokuju
. . .

All of the shop/restaurant names (1) to (5) included in this list are shop/restaurant names corresponding to the shop/restaurant information on which the user had gazed for a predetermined length of time or longer.

The order in the list can be set in various ways. For example, those with newer attention timing of the user are ranked higher. Alternatively, those with longer length of time of gazing are set to be ranked higher.

Note that the URL link information of the shop/restaurant information web page is embedded in the shop/restaurant name included in the list.

This attention shop/restaurant list can be browsed by using the user terminal 10 of the user A50.

Browsing processing of the attention shop/restaurant list using the user terminal 10 of the user A50 will be described with reference to FIG. 8.

Figure 8:
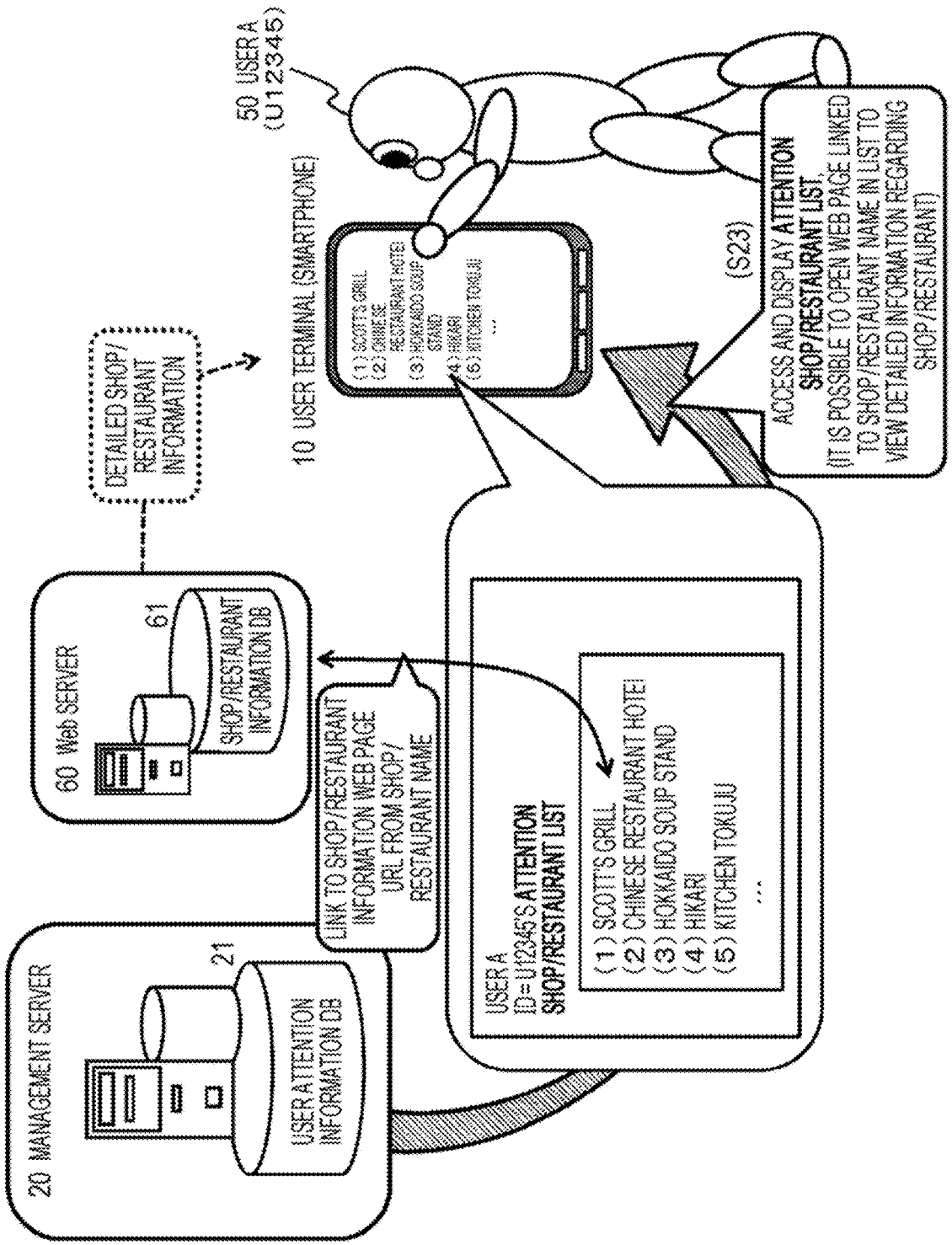
FIG. 8 is a diagram explaining a configuration and a processing example of an information processing device.

As shown in (step S23) of FIG. 8, the user A50 can access and display the "attention shop/restaurant list" stored in the user attention information DB 21 of the management server 20 by using his/her own user terminal 10.

Note that the link information of the web page including the shop/restaurant detail information has been embedded in the shop/restaurant name in the list displayed on the user terminal 10. By designating (tapping, for example) the shop/restaurant name in the list displayed on the user terminal 10, the user A50 can access the web page of the shop/restaurant stored in a shop/restaurant information DB 61 of the web server 60 and check the detailed information of the shop/restaurant.

(2-3. Regarding a Processing Example in which the Management Server Generates Merged Data of Attention Shop/Restaurant Lists of a Plurality of Users)

Next, as a modification example of the second embodiment, a processing example in which the management server 20 generates merged data of attention shop/restaurant lists of a plurality of users will be described.

This processing example will be described with reference to FIG. 9 and subsequent figures.

Figure 9:
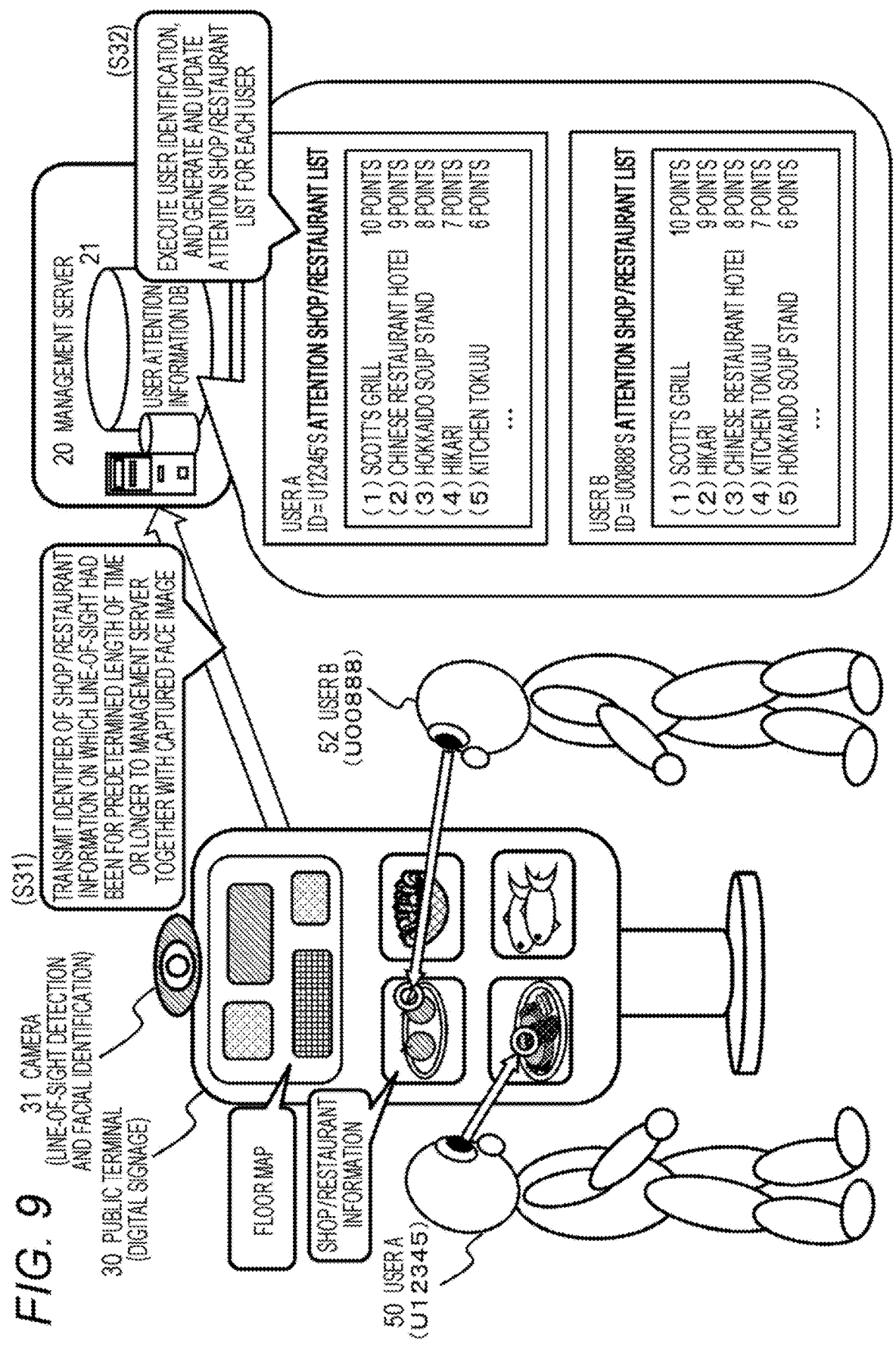
FIG. 9 is a diagram explaining a configuration and a processing example of an information processing device.

FIG. 9 shows one public terminal 30.

The public terminal 30 has a camera 31 and a display unit 32.

The display unit 32 displays, for example, a floor map and shop/restaurant information of each shop/restaurant on the floor.

Two users A50 and B52 are viewing the shop/restaurant information displayed on the display unit 32.

The user A50 and the user B52 are viewing a different piece of shop/restaurant information from each other.

In a case of determining in the (step S31) shown in the figure that the user's point of gaze had been on one shop/restaurant information display region for a predetermined length of time (for example, 3 seconds) or longer, the control unit (data processing unit) inside the public terminal 30 transmits, to the management server 20, the identifier of the shop/restaurant information together with the face image of the user captured by the camera 31.

In this example, the following data (a) and (b) are transmitted from the user terminal 30 to the management server 20.
(a) Face image of the user A50 and the identifier of the shop/restaurant information that the user A50 had gazed,
(b) Face image of the user B52 and the identifier of the shop/restaurant information that the user B52 had gazed, Next, in (step S22) shown in the figure, the management server 20 executes user identification on the basis of the face image of the user received from the public terminal 30, and further generates an attention shop/restaurant list for each identified user.

In this example, the management server 20 generates the following two lists (a) and (b).
(a) Attention shop/restaurant list corresponding to the user A50 (user ID=U12345),
(b) Attention shop/restaurant list corresponding to the user B52 (user ID=U00888), These correspond to the two lists shown on the right side of FIG. 9.

Note that the order in the list can be set in various ways. For example, those with newer attention timing of the user are ranked higher. Alternatively, those with longer length of time of gazing are set to be ranked higher.

Note that in this processing example, scores (0 to 10 points) are set for the shop/restaurant names listed in the attention shop/restaurant list.

The score can be set in various ways, including setting of decrementing by one, such as 10 points, 9 points, 8 points, . . . , from the top in accordance with the order in the list. For example, the score may be configured to be set in accordance with the length of time of gazing.

Moreover, in a case where the user A50 and the user B52 are users belonging to one group registered in advance, the management server 20 executes merge processing of the attention shop/restaurant lists of the users belonging to same group to generate an attention shop/restaurant merged list.

Generation processing of an attention shop/restaurant merged list to be executed by the management server 20 will be described with reference to FIG. 10.

Figure 10:
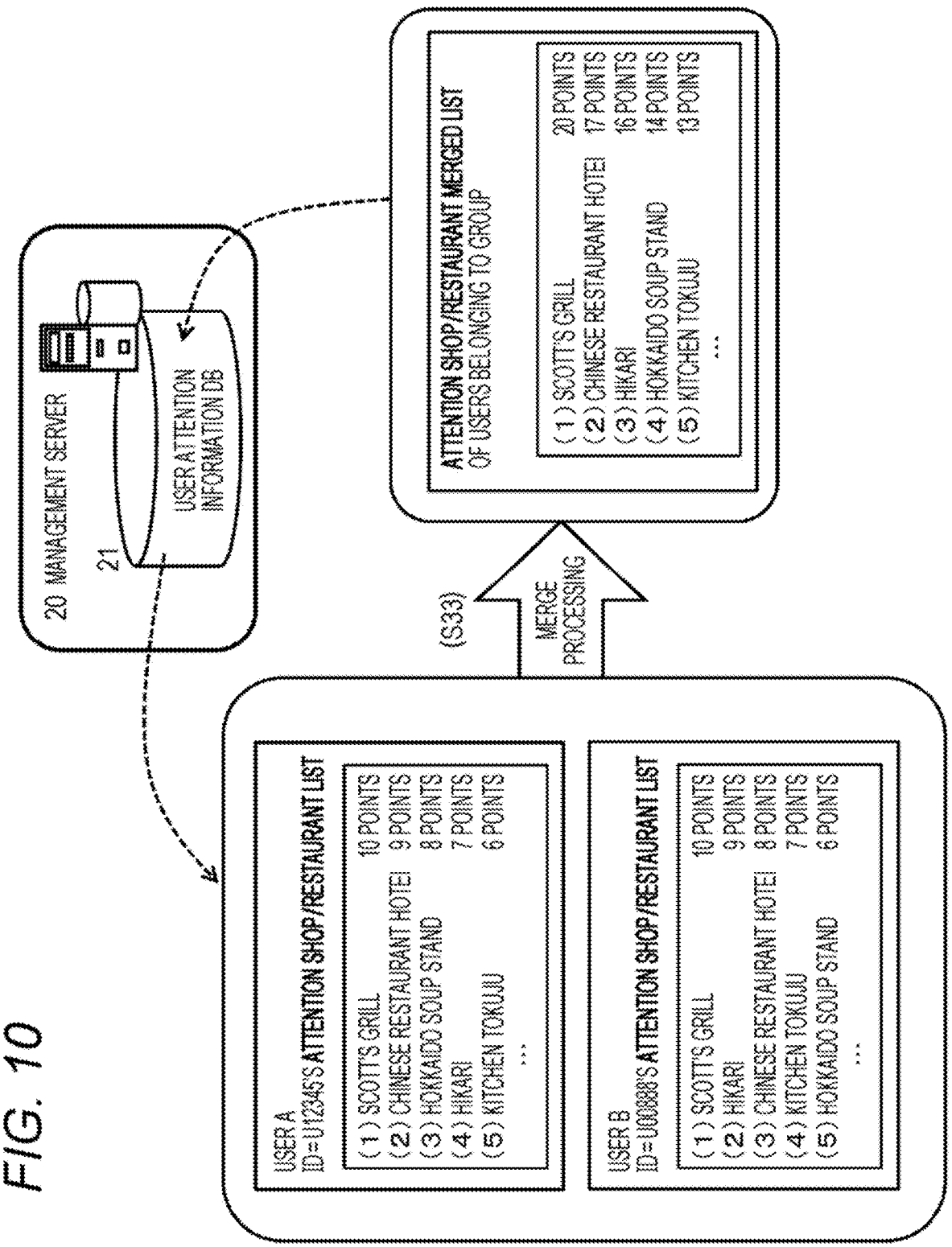
FIG. 10 is a diagram explaining a configuration and a processing example of an information processing device.

As shown in FIG. 10, in step S33, the management server 20 merges the following two shop/restaurant lists
(a) Attention shop/restaurant list corresponding to the user A50 (user ID=U12345),
(b) Attention shop/restaurant list corresponding to the user B52 (user ID=U00888), to generate one attention shop/restaurant list, i.e., an attention shop/restaurant merged list of users belonging to one group.

A score corresponding to each shop/restaurant is also given to the attention shop/restaurant merged list of the users belonging to the group. The score is a score obtained by adding scores having been set in the attention shop/restaurant lists of the individual users to be merged.

The attention shop/restaurant merged list generated by the management server 20 is stored in the user attention information DB 21.

This attention shop/restaurant merged list can be browsed by using the user terminal owned by the user A50, the user B52, or the like.

Browsing processing of the attention shop/restaurant merged list using the user terminal 10 of the user A50 will be described with reference to FIG. 11.

Figure 11:
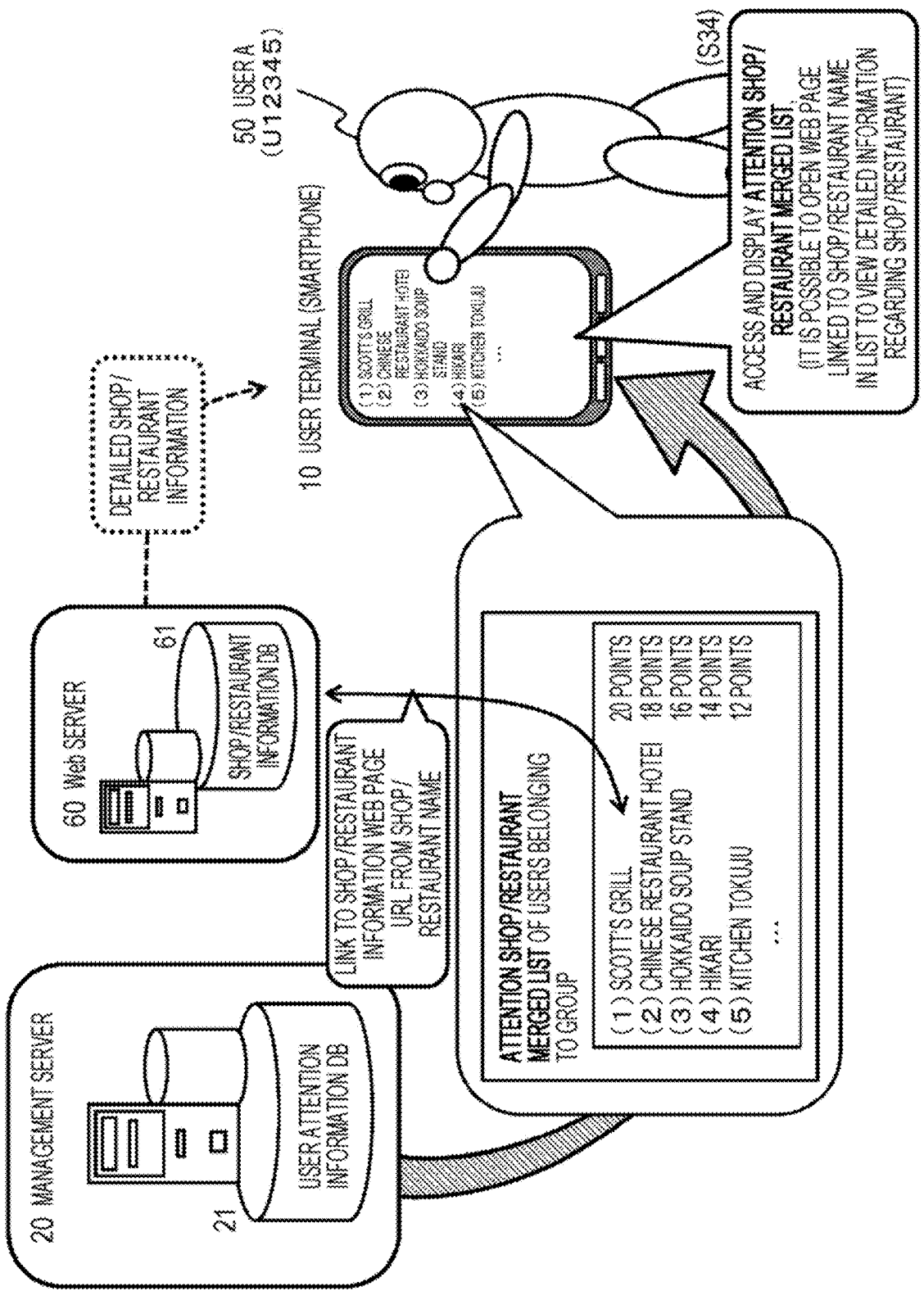
FIG. 11 is a diagram explaining a configuration and a processing example of an information processing device.

As shown in (step S34) of FIG. 11, the user A50 can access and display the "attention shop/restaurant merged list" stored in the user attention information DB 21 of the management server 20 by using his/her own user terminal 10.

Note that the link information of the web page including the shop/restaurant detail information has been embedded in the shop/restaurant name in the list displayed on the user terminal 10. By designating (tapping, for example) the shop/restaurant name in the list displayed on the user terminal 10, the user A50 can access the web page of the shop/restaurant stored in a shop/restaurant information DB 61 of the web server 60 and check the detailed information of the shop/restaurant.

Note that in the present embodiment, the list generation and update have been described as a configuration executed by the management server 20, but these processing can also be configured to be executed in the public terminal 30.

(2-4. Regarding a Configuration Example of the Information Processing System of the Second Embodiment)

Next, a configuration example of the information processing system of the second embodiment will be described.

Figure 12:
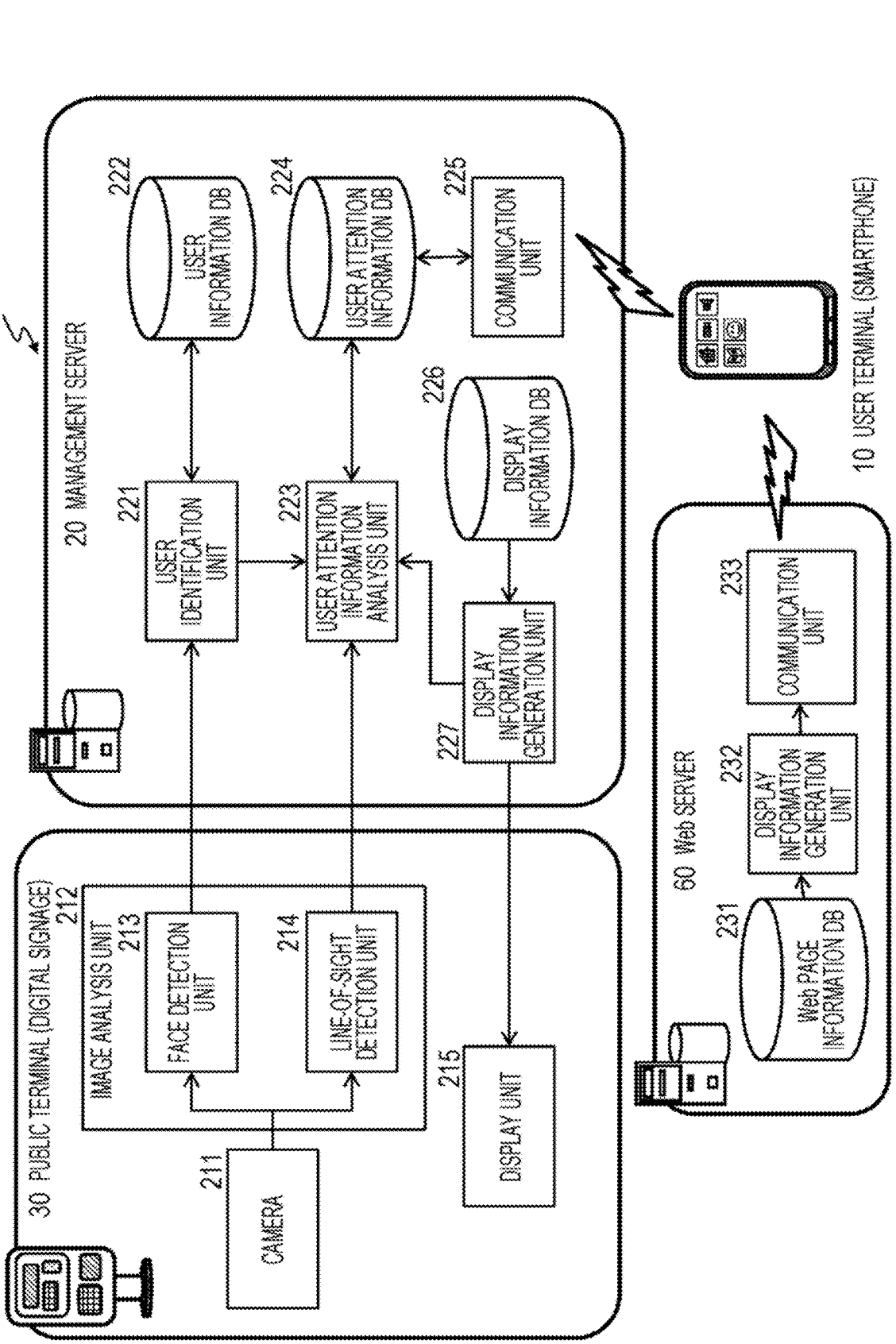
FIG. 12 is a diagram explaining a configuration example of an information processing device.

FIG. 12 is a block diagram explaining a configuration example of an information processing device system 200.

The information processing system 200 shown in FIG. 12 is an example of a system including the public terminal 30, the management server 20, the web server 60, and the user terminal 10 described earlier with reference to FIGS. 6 to 11.

The public terminal 30 has a camera 211, an image analysis unit 212, and a display unit 215. The image analysis unit 212 has a face detection unit 213 and a line-of-sight detection unit 214.

The management server 20 has a user identification unit 221, a user information DB 222, a user attention information analysis unit 223, a user attention information DB 224, a communication unit 225, a display information DB 226, and a display information generation unit 227.

The web server 60 has a web page information DB 231, a display information generation unit 232, and a communication unit 233.

The camera 211 of the public terminal 30 captures an image of the face of a user viewing information displayed on the display unit 215 of the public terminal 30. The captured image is input to the face detection unit 213 and the line-of-sight detection unit 214.

The face detection unit 213 of the image analysis unit 212 detects a face region from an image captured of the camera 211, and transmits the detected face region image to the management server 20.

The line-of-sight detection unit 214 of the image analysis unit 212 analyzes an image captured by the camera 211 to acquire the position of the user's point of gaze, and determines whether or not the user's point of gaze had been on one shop/restaurant information display region for a predetermined length of time (for example, 3 seconds) or longer. In a case of determining that the user's point of gaze had been on one shop/restaurant information display region for a predetermined length of time (for example, 3 seconds) or longer, the line-of-sight detection unit 214 transmits the identifier of the shop/restaurant information to the management server 20.

The display unit 215 of the public terminal 30 displays the display information transmitted from the management server 20. For example, the floor map and shop/restaurant information described with reference to FIG. 7 and the like are displayed.

Next, the configuration and processing of the management server 20 will be described.

The management server 20 has a user identification unit 221, a user information DB 222, a user attention information analysis unit 223, a user attention information DB 224, a communication unit 225, a display information DB 226, and a display information generation unit 227.

The user identification unit 221 inputs an image including a face region detected by the face detection unit 213 of the public terminal 30 from an image captured by the camera 211, and executes user identification processing.

The user identification unit 221 executes user identification by executing matching processing between the face image of the user registered in the user information DB 222 and the face image received from the public terminal 30.

Note that the user information DB 222 stores the corresponding data of the user ID of the registered user and the face image.

The user attention information analysis unit 223 inputs, from the line-of-sight detection unit 214 of the public terminal 30, the identifier of the shop/restaurant information to which the user paid attention. That is, the identifier of the shop/restaurant information determined that the user's point of gaze had been on one shop/restaurant information display region for a predetermined length of time (for example, 3 seconds) or longer is input.

The user attention information analysis unit 223 generates a user attention shop/restaurant list for each user identified by the user identification unit 221.

For example, it is a list including the following shop/restaurant names described earlier with reference to FIG. 7.

(1) Scott's Grill
(2) Chinese Restaurant Hotei
(3) Hokkaido Soup Stand
(4) HIKARI
(5) KITCHEN Tokuju
. . .

All of the shop/restaurant names (1) to (5) included in this list are shop/restaurant names corresponding to the shop/restaurant information on which the user had gazed for a predetermined length of time or longer.

The order in the list can be set in various ways. For example, those with newer attention timing of the user are ranked higher. Alternatively, those with longer length of time of gazing are set to be ranked higher.

Note that the URL link information of the shop/restaurant information web page has been embedded in the shop/restaurant name included in the list.

The attention shop/restaurant list generated by the user attention information analysis unit 223 is stored in the user attention information DB 224.

The attention shop/restaurant list stored in the user attention information DB 224 can be accessed and browsed by the user terminal 10 such as a smartphone.

The display information DB 226 stores contents to be displayed on the display unit 215 of the public terminal 30.

The display information generation unit 227 combines the contents stored in the display information DB 226 to generate data to be displayed on the display unit 215 of the public terminal 30, and transmits it to the public terminal 30. The transmitted data is displayed on the display unit 215 of the public terminal 30.

The user terminal 10 can display the attention shop/restaurant list stored in the user attention information DB 224 of the management server 20.

Note that the URL link information of the shop/restaurant information web page has been embedded in the shop/restaurant name included in the attention shop/restaurant list displayed on the user terminal 10.

By designating (tapping, for example) the shop/restaurant name in the list displayed on the user terminal 10, the user can access the web page of the shop/restaurant stored in the shop/restaurant information DB 61 of the web server 60 and check the detailed information of the shop/restaurant.

The display information generation unit 232 of a web server 60 generates display data based on the web page of a shop/restaurant stored in the shop/restaurant information DB 61, and transmits it to the user terminal 10 via the communication unit 233.

Note that in the system configuration shown in FIG. 12, the distribution of the processing functions between the management server 20 and the public terminal 30 can be set in various ways. For example, all the execution functions of the management server 20 can be set as functions in the public terminal 30.

Furthermore, the management server 20 may have the function of the web server 60.

(2-5. Regarding the Sequence of Processing Executed by the Information Processing System of the Second Embodiment)

Next, the sequence of processing executed by the information processing system 200 will be described with reference to the flowchart shown in FIG. 13.

Figure 13:
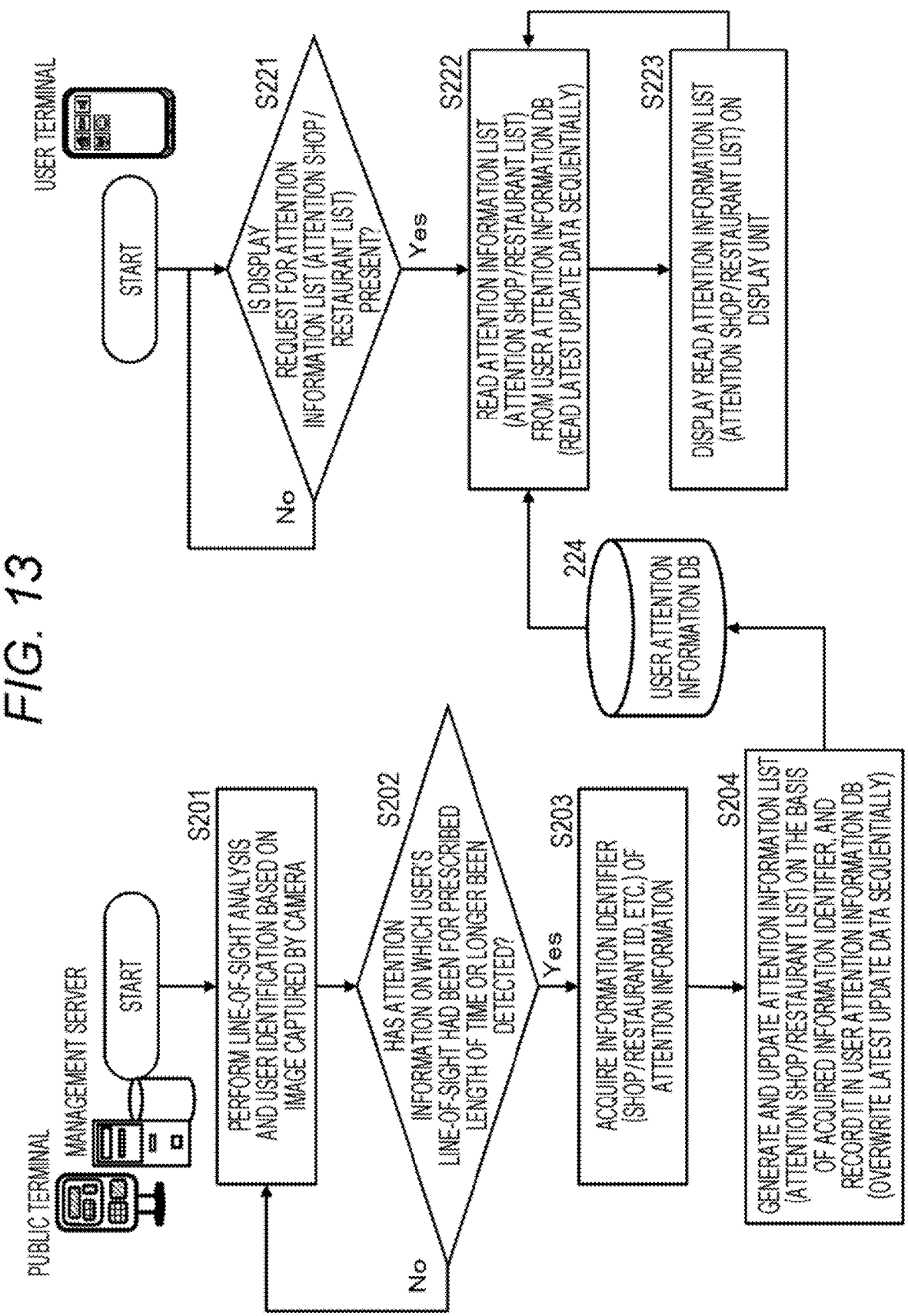
FIG. 13 is a view showing a flowchart explaining a sequence of processing executed by the information processing device of the present disclosure.

Note that the processing in accordance with the flowchart shown in FIG. 13 can be executed in accordance with the program stored in the storage unit of each of the information processing devices such as the public terminal 30, the management server 20, the user terminal 10, and the web server 60, which are the information processing devices configuring the information processing system 200, and can be executed as program execution processing by a processor such as a CPU having a program execution function, for example.

The processing of each step of the flow shown in FIG. 13 will be described below.

Note that the processing of steps S201 to S204 in the flow shown in FIG. 13 are processing executed by the public terminal 30 and the management server 20. The processing of steps S221 to S223 are processing executed by the user terminal 10. Each of these processing can be executed in parallel.

First, the processing of steps S201 to S204 will be described.

(Step S201)

First, in step S201, line-of-sight analysis and user identification based on the image captured by the camera of the public terminal 30 are executed. This processing is processing executed by the face detection unit 213 and the line-of-sight detection unit 214 of the public terminal 30 shown in FIG. 12, and the user identification unit 221 of the management server 20.

The face detection unit 213 of the public terminal 30 detects a face region from an image captured of the camera 211 of the public terminal 30, and transmits the detected face region image to the management server 20.

Moreover, the line-of-sight detection unit 214 of the public terminal 30 analyzes an image captured by the camera 211 of the public terminal 30 to acquire the position of the user's point of gaze.

The user identification unit 221 of the management server 20 inputs an image including a face region detected by the face detection unit 213 of the public terminal 30 from an image captured by the camera 211, and executes user identification processing.

The user identification unit 221 executes user identification by executing matching processing between the face image of the user registered in the user information DB 222 and the face image received from the public terminal 30.

(Step S202)

Next, in step S202, it is determined whether or not attention information on which the user line-of-sight had been for a prescribed length of time or longer has been detected.

This processing is processing executed by the line-of-sight detection unit 214 of the public terminal 30 shown in FIG. 12.

The line-of-sight detection unit 214 of the public terminal 30 shown in FIG. 12 determines, on the basis of the image captured by the camera 211, whether or not the user's point of gaze had been on one shop/restaurant information display region for a predetermined length of time (for example, 3 seconds) or longer. In a case of determining that the user's point of gaze had been on one shop/restaurant information display region for a predetermined length of time (for example, 3 seconds) or longer, the line-of-sight detection unit 214 transmits the identifier of the shop/restaurant information to the management server 20.

In a case where, in step S202, attention information on which the user line-of-sight had been for a prescribed length of time or longer has been detected, the processing proceeds to step S203. If not detected, the processing of step S201 and the subsequent steps are repeated.

(Step S203)

In a case where, in step S202, attention information on which the user line-of-sight had been for a prescribed length of time or longer has been detected, the processing proceeds to step S203.

Step S203 is processing executed by the user attention information analysis unit 223 of the management server 20 shown in FIG. 12.

The user attention information analysis unit 223 inputs, from the line-of-sight detection unit 214 of the public terminal 30, the identifier of the shop/restaurant information on which the user's point of gaze had been for a predetermined length of time (for example, 3 seconds) or longer.

(Step S204)

Next, in step S204, a user attention shop/restaurant list is generated on the basis of the shop/restaurant information identifier acquired in step S203.

This processing is processing executed by the user attention information analysis unit 223 of the management server 20 shown in FIG. 12.

The user attention information analysis unit 223 generates a user attention shop/restaurant list for each user identified by the user identification unit 221 of the management server 20.

For example, it is a list including the following shop/restaurant names described earlier with reference to FIG. 7.

(1) Scott's Grill
(2) Chinese Restaurant Hotei
(3) Hokkaido Soup Stand
(4) HIKARI
(5) KITCHEN Tokuju
. . .

All of the shop/restaurant names (1) to (5) included in this list are shop/restaurant names corresponding to the shop/restaurant information on which the user had gazed for a predetermined length of time or longer.

The order in the list can be set in various ways. For example, those with newer attention timing of the user are ranked higher. Alternatively, those with longer length of time of gazing are set to be ranked higher.

Note that the URL link information of the shop/restaurant information web page has been embedded in the shop/restaurant name included in the list.

The attention shop/restaurant list generated by the user attention information analysis unit 223 is stored in the user attention information DB 224.

The attention shop/restaurant list stored in the user attention information DB 224 can be accessed and browsed by the user terminal 10 such as a smartphone.

Next, the processing of steps S221 to S223 executed in parallel with the processing of steps S201 to S204 will be described.

This processing of steps S221 to S223 are executed in the user terminal 10 such as a smartphone.

(Step S221)

First, in step S221, the presence/absence of a display request for the attention information list, i.e., the attention shop/restaurant list for each user.

This processing is executed by the control unit (data processing unit) of the user terminal 10.

In a case where it is determined in step S221 that a display request for the attention shop/restaurant list has been made, the processing proceeds to step S222.

(Step S222)

In a case where it is determined in step S221 that a display request for the attention shop/restaurant list has been made, the processing proceeds to step S222, and in step S222, the attention shop/restaurant list stored in the user attention information DB 224 of the management server 20 is read.

Note that the attention shop/restaurant list is a list generated and updated by the user attention information analysis unit 223 of the management server 20 in the processing of step S204 described earlier, and the latest update data is read from the user attention information DB 224.

(Step S223)

Next, in step S223, the attention shop/restaurant list having been read is displayed on the display unit of the user terminal 10.

The attention shop/restaurant list is an attention shop/restaurant list for each user, the attention shop/restaurant list described earlier with reference to FIG. 7 and the like.

Note that it is also possible to execute reading of the attention shop/restaurant merged list in which the attention shop/restaurant lists of the plurality of users described with reference to FIGS. 9 to 11 are merged.

Thus, the user terminal 10 can display the attention shop/restaurant list or the attention shop/restaurant merged list stored in the user attention information DB 224 of the management server 20.

Note that the URL link information of the shop/restaurant information web page has been embedded in the shop/restaurant name included in the list displayed on the user terminal 10.

By designating (tapping, for example) the shop/restaurant name in the list displayed on the user terminal 10, the user can access the web page of the shop/restaurant stored in the shop/restaurant information DB 61 of the web server 60 and check the detailed information of the shop/restaurant.

3. Regarding Other Embodiments

Next, other embodiments that can be executed in conjunction with the first and second embodiments mentioned above will be described.

In the first and second embodiments mentioned above, as a determination method of the attention information of the user, a processing example based on the length of time of the user's point of gaze has been described.

The determination method of the attention information is not limited to the measurement processing of the length of time of the user's point of gaze, and other methods may be applied. For example, a configuration in which machine learning of eye movements is performed and the result of the learning processing is used to perform processing of determining the attention information may be adopted.

Furthermore, in the first and second embodiments mentioned above, an image captured by the camera is used for detecting the line-of-sight of the user, but various other methods can be used as the user line-of-sight detection method. For example, a configuration in which line-of-sight detection is performed by using a sensor such as electro-oculogram (EGG) that measures the electric potential of the eyeball may be adopted.

Moreover, in the first and second embodiments mentioned above, it is necessary to perform the user's line-of-sight detection.

However, there can be a case where the accuracy of the line-of-sight detection by the image captured by the camera is insufficient.

For example, in a case where the user wears glasses or in a case where the image of the eye region is unclear, the line-of-sight detection accuracy by the image captured by the camera is likely to be lowered.

If the line-of-sight detection accuracy is low, for example, there is a case where a specifiable region of the user's line-of-sight spans over a plurality of information regions.

In such a case, a configuration in which the display information of the display unit is enlarged and displayed to perform display control that makes it easier to narrow down the attention target region of the user's line-of-sight may be adopted.

Furthermore, a configuration in which not only the line-of-sight detection of the user but also other information is used for specifying processing of the user attention information may be adopted.

For example, the user terminal 10 or the like, which is an information processing device, executes voice reading of chat text or the shop/restaurant name of the displayed shop/restaurant. In response to this, the user makes a gesture such as nodding to the reading timing of the chat text to be replied or the attention shop/restaurant name.

A configuration in which processing that in a case where this gesture has successfully confirmed on the basis of the image captured by the camera, the information is included in the list is performed may be adopted.

Furthermore, as the recognized gestures, in addition to nodding, various gestures such as a change in the orientation of the head or a cue by a hand or an arm can be used.

Furthermore, a configuration in which the user's voice input by a microphone is recognized may be adopted.

Furthermore, in the above embodiments, a user ID list and a shop/restaurant name list are shown as examples of the list to be created. However, a list including various other information may be configured to be generated. For example, a configuration in which a song title list, a task list of schedule, or the like is generated as a list in descending order of the user's attention or in order of the latest attention.

Furthermore, a configuration in which in a case where the generated list is displayed on the user terminal, the generated list is displayed after being narrowed down to the information in accordance with the timing of use of the information included in the list in consideration of the timing of use may be adopted.

For example, it is processing that in a case where shop/restaurant information is displayed, if the display timing is at noon, the shops/restaurants having the service of lunch are preferentially displayed, and the information of the shops/restaurants having the service of dinner course are preferentially displayed at night.

Furthermore, in the second embodiment described above, the configuration in which the order in the list is decided on the basis of the latest attention information and the length of time of line-of-sight, and a higher score (weight) is set from the top of the list.

This score can be set not only in such manner but also in various other ways. For example, a configuration in which the score corresponding to each presentation information is calculated on the basis of the action history of the information providing entity or the user may be adopted. For example, it is processing that a high score is set to a user's dish favorite food.

Moreover, setting in which the score is changed depending on the person browsing the list may be adopted.

Note that in the first embodiment, data to be selected from the generated list and displayed is used as a user ID, but in the case of similar user IDs, there is a possibility that a mistake is made at the time of selection.

In order to eliminate such a problem, a configuration in which a part of the message is displayed together with the user ID may be adopted.

Moreover, a configuration in which the unselectable user ID or shop/restaurant name, for example, the user ID of a withdrawn user, the shop/restaurant name of a closed shop/restaurant name, and the like is displayed in a display mode different from other data such as being grayed out may be adopted.

Moreover, in the above-described embodiments, the list is set to include information that had been gazed for a prescribed length of time of line-of-sight, for example, 3 seconds or longer. This prescribed length of time may be changed depending on the type of information of the target to be gazed.

It is a setting that, for example, the length of time is shortened in a case of an image, and lengthened in a case of text.

The information displayed in the display list may be configured to be displayed in different colors for each category. Moreover, not only display processing of the list but also processing for reading the display data by voice may be performed.

Figure 14:
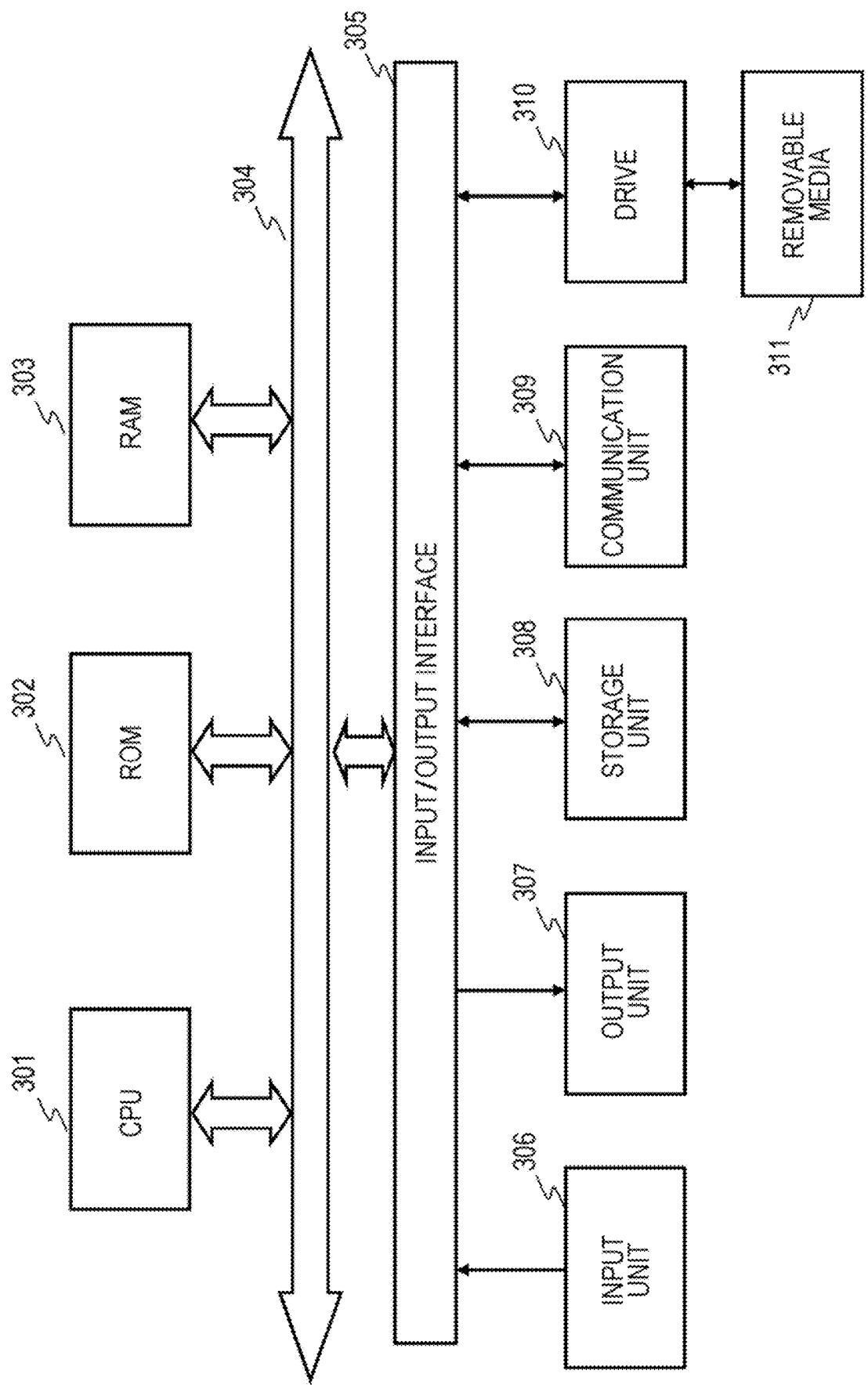
FIG. 14 is a diagram explaining a hardware configuration example of an information processing device.

4. Regarding a Hardware Configuration Example of an Information Processing Device Next, a configuration example of a hardware configuration of an information processing device that can be used as the user terminal 10, the management server 20, the public terminal 30, and the web server 60 will be described with reference to FIG. 14.

A central processing unit (CPU) 301 functions as a control unit or a data processing unit that executes various processing in accordance with a program stored in a read only memory (ROM) 302 or a storage unit 308. For example, the processing in accordance with the sequence described in the embodiments described above is executed. A random access memory (RAM) 303 stores a program, data, and the like executed by the CPU 301. These CPU 301, ROM 302, and RAM 303 are interconnected by a bus 304.

The CPU 301 is connected to an input/output interface 305 via the bus 304, and the input/output interface 305 is connected with an input unit 306 including various switches, a keyboard, a mouse, a microphone, a camera, and a sensor, and an output unit 307 including a display and a speaker. The CPU 301 executes various processing in response to a command input from the input unit 306, and outputs the processing result to the output unit 307, for example.

The storage unit 308 connected to the input/output interface 305 includes, for example, a hard disk, and stores a program and various data executed by the CPU 301. The communication unit 309 functions as a transmission/reception unit of Wi-Fi communication, Bluetooth (registered trademark) (BT) communication, and data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and executes record or read of data.

5. Summary of the Configuration of the Present Disclosure

The embodiments of the present disclosure have been described in detail with reference to specific embodiments. However, it is obvious that a person skilled in the art can make modifications or substitutions of the embodiments without departing from the scope of the present disclosure. That is, the present invention has been disclosed in the form of an example, and should not be construed as being limited. The claims should be considered in order to make a judgement on the scope of the present disclosure.

Note that the technology disclosed in the present description can have the following configuration.

(1) An information processing device including:
a line-of-sight detection unit that detects a user's point of gaze with respect to display information of a display unit;
a user attention information analysis unit that extracts attention information of the user on the basis of an analysis of the user's point of gaze and generates a list including information corresponding to the attention information; and a display information generation unit that generates a display list including configuration data of the list.

(2) The information processing device according to (1), in which the line-of-sight detection unit detects a user's point of gaze with respect to display information of a display unit on the basis of an image captured by a camera, and the user attention information analysis unit extracts attention information on which the user's point of gaze had been for a prescribed length of time or longer, and generates a list including information corresponding to the attention information.

(3) The information processing device according to (1) or (2), in which the user attention information analysis unit continuously inputs user's point-of-gaze information analyzed by the line-of-sight detection unit, and, on the basis of input information, executes list update processing accompanied by sorting processing for setting latest attention information in a top of the list.

(4) The information processing device according to (1) or (2), in which the user attention information analysis unit continuously inputs user's point-of-gaze information analyzed by the line-of-sight detection unit, and, on the basis of input information, executes list update processing accompanied by sorting processing for setting, in a top of the list, attention information on which a user's point of gaze is for a long length of time.

(5) The information processing device according to any of (1) to (4), in which the display information generation unit generates a display list including only highly ranked data of configuration data of the list.

(6) The information processing device according to any of (1) to (5), in which the display information is a message in a chat screen, the line-of-sight detection unit detects a message gazed by a user, the user attention information analysis unit extracts an attention message on which the user's point of gaze had been for a prescribed length of time or longer, and generates a user ID list including a user ID of an originator of the attention message, and the display information generation unit generates a user ID selection menu including individually selectable user IDs.

(7) The information processing device according to (6) further including a display control unit that displays the user ID selection menu on a user terminal, in which the user ID selection menu has a configuration in which user ID entry is possible by user selection.

(8) The information processing device according to (6) or (7), in which the user ID selection menu includes user ID and a part of message.

(9) The information processing device according to any of (1) to (5), in which the display information is shop/restaurant information, the line-of-sight detection unit detects shop/restaurant information of a user's target of gaze, the user attention information analysis unit extracts attention shop/restaurant information on which the user's point of gaze had been for a prescribed length of time or longer, and generates a shop/restaurant list including a shop/restaurant name corresponding to the attention shop/restaurant information, and the display information generation unit generates a display list including a shop/restaurant name included in a shop/restaurant list.

(10) The information processing device according to (9), in which the display information generation unit generates a display list in which access information of a shop/restaurant name providing detailed information of each shop/restaurant is embedded in a shop/restaurant name included in the display list.

(11) An information processing system having a display device and a management server, in which the display device has a line-of-sight detection unit that detects a user's point of gaze with respect to display information of a display unit, and the management server has a user attention information analysis unit that inputs user's point-of-gaze information having been analyzed in the display device, extracts attention information of the user on the basis of an analysis of the user's point of gaze, and generates a list including information corresponding to the attention information, and a display information generation unit that generates a display list including configuration data of the list.

(12) The information processing system according to (11), in which in the display device, the line-of-sight detection unit detects a user's point of gaze with respect to display information of a display unit on the basis of an image captured by a camera, and in the management server, the user attention information analysis unit extracts attention information on which the user's point of gaze had been for a prescribed length of time or longer, and generates a list including information corresponding to the attention information.

(13) The information processing system according to (12), in which the display device further transmits the image captured by the camera to the management server, and the management server has a user identification unit that executes user identification on the basis of the image captured by the camera input from the display device.

(14) The information processing system according to (13), in which in the management server, the user attention information analysis unit generates a list for each user identified in the user identification unit, and the display information generation unit generates a display list for each user identified in the user identification unit.

(15) The information processing system according to (13), in which in the management server, the user attention information analysis unit generates a list for each user identified in the user identification unit, and generates a merged list in which a plurality of lists for each user has been merged, and the display information generation unit generates a display list including configuration data of the merged list.

(16) The information processing system according to any of (11) to (15), in which
in the management server,
the user attention information analysis unit generates a list in which a score that decrements in descending order from a top is set for each list configuration data.

(17) An information processing method executed in an information processing device, the information processing method executing
a line-of-sight detection step in which a line-of-sight detection unit detects a user's point of gaze with respect to display information of a display unit,
a user attention information analysis step in which a user attention information analysis unit extracts attention information of the user on the basis of an analysis of the user's point of gaze and generates a list including information corresponding to the attention information, and
a display information generation step in which a display information generation unit generates a display list including configuration data of the list.

(18) An information processing method executed in an information processing system having a display device and a management server, the information processing method, in which
the display device executes line-of-sight detection processing of detecting a user's point of gaze with respect to display information of a display unit, and
the management server executes
user attention information analysis processing of inputting user's point-of-gaze information having been analyzed in the display device, extracting attention information of the user on the basis of an analysis of the user's point of gaze, and generating a list including information corresponding to the attention information, and
display information generation processing of generating a display list including configuration data of the list.

(19) A program causing an information processing device to execute information processing, the program causing
a line-of-sight detection unit to execute a line-of-sight detection step of detecting a user's point of gaze with respect to display information of a display unit,
a user attention information analysis unit to execute a user attention information analysis step of extracting attention information of the user on the basis of an analysis of the user's point of gaze and generating a list including information corresponding to the attention information, and
a display information generation unit to execute a display information generation step of generating a display list including configuration data of the list.

Furthermore, the series of processing described in the description can be executed by hardware, software, or a combined configuration of both. In a case of executing the processing by software, it is possible to execute a program in which the processing sequence is recorded by installing the program in a memory in a computer incorporated in dedicated hardware, or to execute the program by installing the program in a general-purpose computer capable of executing various types of processing. For example, the program can be recorded in advance in a recording medium. In addition to installing from a recording medium to a computer, it is possible to receive a program via a network such as a local area network (LAN) or the Internet, and to install it in a recording medium such as a built-in hard disk.

Note that the various types of processing described in the description may be not only executed in time series in accordance with the description but also executed in parallel or individually depending on the processing capacity of the device that executes the processing or as required. Furthermore, in the present description, the system is a logical set configuration of a plurality of devices, and the system is not limited to those having devices of each configuration are in a same housing.

INDUSTRIAL APPLICABILITY

As described above, according to the configuration of an embodiment of the present disclosure, a configuration that detects user attention information and executes various processing based on the detected attention information is embodied.

Specifically, the configuration of an embodiment of the present disclosure has, for example, an image analysis unit that detects a user's point of gaze with respect to display information of a display unit on the basis of an image captured by a camera, a user attention information analysis unit that extracts attention information on which a user's point of gaze had been for a prescribed length of time or longer and generates a list including information corresponding to the attention information, and a display information generation unit that generates a display list including list configuration data. The user attention information analysis unit continuously inputs user's point-of-gaze information, and executes sorting processing for setting, in the top of the list, latest attention information or attention information on which the user's point of gaze is for a long length of time. The display information generation unit generates a display list including top data of list configuration data, for example.

This configuration implements a configuration that detects user attention information and executes various processing based on the detected attention information.

REFERENCE SIGNS LIST

10 User terminal
20 Management server
30 Public terminal
60 Web server
100 Information processing device
101 Camera
102 Image analysis unit
103 User attention information analysis unit
104 User attention information DB
105 Display information generation unit (user ID selection menu generation unit)
106 Display control unit
107 Input unit
108 Communication unit
109 Storage unit
110 Display unit
200 Information processing system
211 Camera
212 Image analysis unit
213 Face detection unit
214 Line-of-sight detection unit
215 Display unit
221 User identification unit
222 User information DB
223 User attention information analysis unit
224 User attention information DB 225 Communication unit
226 Display information DB
227 Display information generation unit
231 Web page DB
232 Display information generation unit
233 Communication unit
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An information processing device comprising:
circuitry configured to
detect a user's point of gaze with respect to display information of a display, the display information being a message in a chat screen,
extract attention information of the user on a basis of an analysis of the user's point of gaze,
generate a list including information corresponding to the attention information,
generate a display list including configuration data of the list,
wherein the circuitry is configured to detect a message gazed by a user, extract an attention message on which the user's point of gaze had been for a prescribed length of time or longer, generate a user ID list including a user ID of an originator of the attention message, and generate a user ID selection menu including individually selectable user IDs.

2. The information processing device according to claim 1, wherein
the circuitry is configured to detect a user's point of gaze with respect to display information of the display on a basis of an image captured by a camera, and
the circuitry is configured to extract attention information on which the user's point of gaze had been for a prescribed length of time or longer, and generates a list including information corresponding to the attention information.

3. The information processing device according to claim 1, wherein
the circuitry is configured to continuously input user's point-of-gaze information, and, on a basis of input information, executes list update processing accompanied by sorting processing for setting latest attention information in a top of the list.

4. The information processing device according to claim 1, wherein
the circuitry is configured to
continuously input user's point-of-gaze information, and, on a basis of input information, execute list update processing accompanied by sorting processing for setting, in a top of the list, the extracted attention information on which a user's point of gaze is for a long length of time among two or more sets of the extracted attention information on which the user's point of gaze had been for a prescribed length of time or longer.

5. The information processing device according to claim 1, wherein
the circuitry is configured to
generate a display list including only highly ranked data of configuration data of the list.

6. The information processing device according to claim 1, wherein
the circuitry is configured to display the user ID selection menu on a user terminal, wherein
the user ID selection menu has a configuration in which user ID entry is possible by user selection.

7. The information processing device according to claim 1, wherein the user ID selection menu includes user ID and a part of message.

8. The information processing device according to claim 1, wherein
the display information is shop/restaurant information,
the circuitry is configured to detect shop/restaurant information of a user's target of gaze,
the circuitry is configured to extract attention shop/restaurant information on which the user's point of gaze had been for a prescribed length of time or longer, and generate a shop/restaurant list including a shop/restaurant name corresponding to the attention shop/restaurant information, and
the circuitry is configured to generate a display list including a shop/restaurant name included in a shop/restaurant list.

9. The information processing device according to claim 8, wherein the circuitry is configured to generate a display list in which access information of a shop/restaurant name providing detailed information of each shop/restaurant is embedded in a shop/restaurant name included in the display list.

10. A non-transitory computer-readable storage medium including computer executable instructions, wherein the instructions, when executed by an information processing device, cause the information processing device to perform a method, the method comprising:
detecting a user's point of gaze with respect to display information of a display, the display information being a message in a chat screen;
extracting attention information of the user on a basis of an analysis of the user's point of gaze;
generating a list including information corresponding to the attention information; and
generating a display list including configuration data of the list,
wherein a message gazed by a user is detected,
wherein an attention message on which the user's point of gaze had been for a prescribed length of time or longer is extracted,
wherein a user ID list including a user ID of an originator of the attention message is generated, and
wherein a user ID selection menu including individually selectable user IDs is generated.

11. The non-transitory computer-readable storage medium according to claim 10, wherein the method further comprising:
extracting user's point of gaze with respect to display information of the display is extracted on a basis of an image captured by a camera;
extracting attention information on which the user's point of gaze had been for a prescribed length of time or longer; and
generating a list including information corresponding to the attention information.

12. The non-transitory computer-readable storage medium according to claim 10, wherein the method further comprising:
   continuously inputting user's point-of-gaze information; and
   executing, on a basis of input information, list update processing accompanied by sorting processing for setting latest attention information in a top of the list.

13. The non-transitory computer-readable storage medium according to claim 10, wherein the method further comprising:
   continuously inputting user's point-of-gaze information; and
   executing, on a basis of input information, execute list update processing accompanied by sorting processing for setting, in a top of the list, the extracted attention information on which a user's point of gaze is for a long length of time among two or more sets of the extracted attention information on which the user's point of gaze had been for a prescribed length of time or longer.

14. The non-transitory computer-readable storage medium according to claim 10, wherein the method further comprising:
   generating a display list including only highly ranked data of configuration data of the list.

15. The non-transitory computer-readable storage medium according to claim 10, wherein the method further comprising:
   displaying user ID selection menu on a user terminal, wherein the user ID selection menu has a configuration in which user ID entry is possible by user selection.

16. The non-transitory computer-readable storage medium according to claim 10, wherein the user ID selection menu includes user ID and a part of message.

17. The non-transitory computer-readable storage medium according to claim 10, wherein the display information is shop/restaurant information, and
   wherein the method further comprising:
      detecting shop/restaurant information of a user's target of gaze;
      extracting attention shop/restaurant information on which the user's point of gaze had been for a prescribed length of time or longer;
      generating a shop/restaurant list including a shop/restaurant name corresponding to the attention shop/restaurant information; and
      generating a display list including a shop/restaurant name included in a shop/restaurant list.

18. The non-transitory computer-readable storage medium according to claim 17, wherein the method further comprising:
   generating a display list in which access information of a shop/restaurant name providing detailed information of each shop/restaurant is embedded in a shop/restaurant name included in the display list.

19. An information processing device comprising:
   circuitry configured to
   detect a user's point of gaze with respect to display information of a display, the display information being shop/restaurant information,
   extract attention information of the user on a basis of an analysis of the user's point of gaze,
   generate a list including information corresponding to the attention information, and
   generate a display list including configuration data of the list,
   wherein the circuitry is configured to detect shop/restaurant information of a user's target of gaze, extract attention shop/restaurant information on which the user's point of gaze had been for a prescribed length of time or longer, generate a shop/restaurant list including a shop/restaurant name corresponding to the attention shop/restaurant information, and generate a display list including a shop/restaurant name included in a shop/restaurant list.

20. The information processing device according to claim 19, wherein the circuitry is configured to generate a display list in which access information of a shop/restaurant name providing detailed information of each shop/restaurant is embedded in a shop/restaurant name included in the display list.

* * * * *